(12) United States Patent
Mateus et al.

(10) Patent No.: US 12,514,472 B2
(45) Date of Patent: *****Jan. 6, 2026

(54) HEALTH-MONITORING MEASUREMENT AND/OR MONITORING WITH A SMARTWATCH THAT INCLUDES ONE OR MORE VCSEL'S

(71) Applicant: Bandwidth10, LTD., Berkeley, CA (US)

(72) Inventors: Carlos Fernando Rondina Mateus, Berkeley, CA (US); Christopher Chase, Berkeley, CA (US); Michael C. Y. Huang, Taipei (TW); Murat Serbay, Berlin (DE); Stefano Prandoni, Berlin (DE); Philip Worland, Berkeley, CA (US)

(73) Assignee: Bandwidth10, LTD., Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/214,986

(22) Filed: Jun. 27, 2023

(65) Prior Publication Data

US 2025/0152045 A1    May 15, 2025

Related U.S. Application Data

(63) Continuation-in-part of application No. 18/207,826, filed on Jun. 9, 2023, now Pat. No. 12,300,970, and
(Continued)

(51) Int. Cl.
*A61B 5/1455* (2006.01)
*A61B 5/00* (2006.01)
(Continued)

(52) U.S. Cl.
CPC ........ *A61B 5/14532* (2013.01); *A61B 5/0062* (2013.01); *A61B 5/1455* (2013.01);
(Continued)

(58) Field of Classification Search
CPC .............. A61B 5/1455; A61B 5/14551; A61B 5/14552; A61B 5/14532; A61B 5/6802;
(Continued)

(56) References Cited

U.S. PATENT DOCUMENTS

2004/0179568 A1    9/2004    Amann et al.
2006/0140235 A1    6/2006    Kim
(Continued)

*Primary Examiner* — Chu Chuan Liu
(74) *Attorney, Agent, or Firm* — Paul Davis

(57) ABSTRACT

A glucose detection or monitoring system that includes a VCSEL laser with one or more active regions having quantum wells and barrier. The active regions are surrounded by one or more p-n junctions. The one or more active regions can include a selected shape structure, and one or more tunnel junctions (TJ). One or more apertures are provided with the selected shape structure, one or more buried tunnel junctions (BTJ) or oxide confine apertured, additional TJ's, planar structures and or additional BTJ's created during a regrowth process that is independent of a first growth process with a VCSEL output determined in response to a monitoring application of the VCSEL, the VCSEL having an HCG grating and a bottom DBR. A housing of a smartwatch interior houses the VCSEL laser. The smartwatch includes one or more of a display, an optical sensor, one or more electrodes, SIM card slot, speaker, microphone, charging pins, and a band.

18 Claims, 32 Drawing Sheets

Related U.S. Application Data a continuation-in-part of application No. 18/207,818, filed on Jun. 9, 2023, now Pat. No. 12,316,075, and a continuation-in-part of application No. 18/207,857, filed on Jun. 9, 2023, now Pat. No. 12,298,436, and a continuation-in-part of application No. 18/207,804, filed on Jun. 9, 2023, now Pat. No. 12,301,291, and a continuation-in-part of application No. 18/207,838, filed on Jun. 9, 2023, now Pat. No. 12,278,462, and a continuation-in-part of application No. 18/207,864, filed on Jun. 9, 2023, and a continuation-in-part of application No. 18/207,810, filed on Jun. 9, 2023, now Pat. No. 12,294,199, and a continuation-in-part of application No. 18/111,902, filed on Feb. 21, 2023, and a continuation-in-part of application No. 18/107,140, filed on Feb. 8, 2023, now Pat. No. 12,224,559.

(60) Provisional application No. 63/432,050, filed on Dec. 12, 2022, provisional application No. 63/415,268, filed on Oct. 11, 2022, provisional application No. 63/402,553, filed on Aug. 31, 2022, provisional application No. 63/402,556, filed on Aug. 31, 2022, provisional application No. 63/402,560, filed on Aug. 31, 2022, provisional application No. 63/402,546, filed on Aug. 31, 2022.

(51) Int. Cl.
*A61B 5/145* (2006.01)
*G16H 20/10* (2018.01)
*G16H 20/30* (2018.01)
*G16H 20/60* (2018.01)
*H01S 5/026* (2006.01)

(52) U.S. Cl.
CPC ............ *A61B 5/681* (2013.01); *A61B 5/7275* (2013.01); *A61B 5/7405* (2013.01); *A61B 5/742* (2013.01); *A61B 5/7475* (2013.01); *G16H 20/10* (2018.01); *G16H 20/30* (2018.01); *G16H 20/60* (2018.01); *A61B 2560/0468* (2013.01); *A61B 2562/0204* (2013.01)

(58) Field of Classification Search
CPC ... A61B 5/6813; A61B 5/6825; A61B 5/6826; A61B 5/681; H01S 5/0264; H01S 5/18; H01S 5/183; H01S 5/18366; H01S 5/18386; H01S 5/11; H01S 5/3095; H01S 5/34306
See application file for complete search history.

(56) References Cited

U.S. PATENT DOCUMENTS

| | | |
|---|---|---|
| 2006/0227835 A1 | 10/2006 | Ueki et al. |
| 2011/0280269 A1 | 11/2011 | Chang-Hasnain et al. |
| 2016/0270656 A1 | 9/2016 | Samec et al. |
| 2019/0387972 A1 | 12/2019 | Hu et al. |
| 2020/0152312 A1* | 5/2020 | Connor ................ A61B 5/4205 |

* cited by examiner

HEALTH-MONITORING MEASUREMENT AND/OR MONITORING WITH A SMARTWATCH THAT INCLUDES ONE OR MORE VCSEL'S

This patent application claims priority from U.S. Provisional Application No. 63/402,546, title 'HCG TUNABLE VCSEL WITH FULLY OXIDIZED BOTTOM DBR (GAAS BASED VCSEL)', filed on Aug. 31, 2022, U.S. Provisional Application No. 63/402,553, title 'HCG TUNABLE VCSEL WITH OPTICAL CONFINEMENT VIA STEP INDEX AND REGROWTH', filed on Aug. 31, 2022, U.S. Provisional Application No. 63/402,556, title 'HCG TUNABLE VCSEL WITH ELECTRICAL AND OPTICAL CONFINEMENT VIA ETCHED POST', filed on Aug. 31, 2022, U.S. Provisional Application No. 63/402,560, title 'FLIP CHIP TUNABLE VCSEL WITH HCG ON SI SUBMOUNT', filed on Aug. 31, 2022, U.S. Provisional Application No. 63/415,268, title 'LIGHT EMITTING DEVICE WITH DETERMINABLE SHAPE OF OUTPUT BEAM', filed on Oct. 11, 2022 and U.S. Provisional Application No. 63/432,050, title 'HCG TUNABLE VCSEL WITH INTEGRATED DETECTOR IN THE SACRIFICIAL LAYER', filed on Dec. 12, 2022; is a continuation in part of U.S. Non-Provisional patent application Ser. No. 18/107,140, title 'LIGHT EMITTING DEVICE WITH DETERMINABLE SHAPE OF OUTPUT BEAM', filed on Feb. 8, 2023, U.S. Non-Provisional patent application Ser. No. 18/111,902, title 'HCG TUNABLE VCSEL WITH ELECTRICAL AND OPTICAL CONFINEMENT VIA ETCHED POST', filed on Feb. 21, 2023; U.S. Non-Provisional patent application Ser. No. 18/207,804, title 'SYSTEMS FOR DETECTING GESTURES', filed on Jun. 9, 2023; U.S. Non-Provisional patent application Ser. No. 18/207,810, title 'SYSTEMS USING (3D) MAPS OF AT LEAST A PART OF A BODY OF A USER', filed on Jun. 9, 2023; U.S. Non-Provisional patent application Ser. No. 18/207,818, title 'SYSTEMS INCLUDING ONE OR MORE VCSELS, FOR RECEIVING A THREE DIMENSIONAL (3D) MAP OF AT LEAST A PART OF A BODY OF A USER', filed on Jun. 9, 2023; U.S. Non-Provisional patent application Ser. No. 18/207,826, title 'DIGITAL CAMERA WITH VCSELS", filed on Jun. 9, 2023; U.S. Non-Provisional patent application Ser. No. 18/207,864, title 'OPTOELECTRONIC DEVICE WITH VCSEL PROVIDING A GRID PATTERN", filed on Jun. 9, 2023; U.S. Non-Provisional patent application Ser. No. 18/207,838, title 'APPARATUS FOR FACIAL RECOGNITION", filed on Jun. 9, 2023; U.S. Non-Provisional patent application Ser. No. 18/207,857, title 'DEPTH MAPPING SENSING APPARATUS", filed on Jun. 9, 2023.

BACKGROUND

Field of the Invention

This invention relates generally to a smartwatch that monitors or measures health parameters of a user, and more particularly to a smartwatch that monitors or measures a wear's glucose.

Brief Description of the Related Art

Diabetes mellitus, often referred to as diabetes, is a chronic condition in which a person has elevated blood glucose levels that result from defects in the body's ability to produce and/or use insulin. There are three main types of diabetes. Type 1 diabetes usually strikes children and young adults, and may be autoimmune, genetic, and/or environmental. Type 2 diabetes accounts for 90-95% of diabetes cases and is linked to obesity and physical inactivity. Gestational diabetes is a form of glucose intolerance diagnosed during pregnancy and usually resolves spontaneously after delivery.

Diabetes is managed primarily by controlling the level of glucose in the bloodstream. This level is dynamic and complex, and is affected by multiple factors including the amount and type of food consumed, and the amount of insulin (which mediates transport of glucose across cell membranes) in the blood. Blood glucose levels are also sensitive to exercise, sleep, stress, smoking, travel, illness, menses, and other psychological and lifestyle factors unique to individual patients. The dynamic nature of blood glucose and insulin, and all other factors affecting blood glucose, often require a person with diabetes to forecast blood glucose levels. Therefore, therapy in the form of insulin or oral medications, or both, can be timed to maintain blood glucose levels in an appropriate range.

Management of diabetes is time-consuming for patients because of the need to consistently obtain reliable diagnostic information, follow prescribed therapy, and manage lifestyle on a daily basis.

A smartwatch is a computerized wristwatch with functionality Smartwatches can be designed with a substantial variety of internal hardware components. Most have a rechargeable battery and graphical display. Many include a touch screen or similar interface. Peripheral devices may possibly include, but are not limited to, such devices as a camera, thermometer, accelerometer, altimeter, barometer, compass, global positioning system (GPS) receiver, audio speaker, and digital memory card that is recognized as a mass storage device by a computer. In addition to hardware, the smartwatch can include a variety of software to perform different tasks and functions.

Like other computers, a smartwatch may be used to collect information from internal or external sensors. A smartwatch may also be used to control other instruments or computers, or retrieve data from them. The smartwatch may support wireless technologies like Wi-Fi®, Bluetooth®, and GPS. For many purposes, a "wristwatch computer" simply serves as a front end for a remote system, communicating by various radio technologies.

Many current smartwatch models are completely functional as standalone products. Some serve as sport watches, with the GPS tracking unit being used to record exercise data, such as travel time, distance, and location. For example, after a workout, data can be uploaded onto a computer or online to create a log of activities for analysis or sharing. Some smartwatches can serve as full GPS watches, displaying maps and current coordinates, and recording tracks. Users can "mark" their current location and then edit the entry's name and coordinates, which enables navigation to those new coordinates.

Some smartwatches function as "sport watches," which often include activity tracker or fitness tracker features as seen in GPS watches made for outdoor sports. Functions may include training programs, stopwatch, speed display, GPS tracking unit, route tracking, dive computer, heart rate monitor compatibility, and cadence sensor compatibility. Smartwatches also walk through tutorials/videos on the watch face.

Other smartwatches can cooperate with an app in a smartphone to carry out their functions. These smartwatches may be little more than timepieces unless they are paired, usually wirelessly, with a mobile phone. Some of these smartwatches only work with a phone that runs the same mobile operating system, whereas others use an operating system unique to the smartwatch, or otherwise are able to work with most smartphones. When paired, a smartwatch may function as a remote access point for the phone, which generally allows the smartwatch to display data such as calls, SMS messages, e-mails, and calendar invites, and any data that may be made available by relevant phone apps. Smartwatches and electronic fitness tracker designs often incorporate wireless technology.

There is a need for a smartwatch with a VCSEL incorporated therein. There is a further need for a smartwatch with a VCSEL that measure various user's body health parameters. Yet there is a further need for a smartwatch with a VCSEL that measures or monitors a user's glucose.

SUMMARY

An object of the present invention is to provide a smartwatch that includes at an interior one or more VCSEL's A further object of the present invention is to provide a smartwatch that includes, at an interior, one or more VCSEL's to measure one or more of a wear's health parameters.

Yet another object of the present invention is to provide a smartwatch with a VCSEL that measures or monitors a user's glucose.

These and other objects of the present invention are achieved in a glucose detection or monitoring system that includes a VCSEL laser with one or more active regions having quantum wells and barrier. The active regions are surrounded by one or more p-n junctions. The one or more active regions can include a selected shape structure, and one or more tunnel junctions (TJ). One or more apertures are provided with the selected shape structure, one or more buried tunnel junctions (BTJ) or oxide confine apertured, additional TJ's, planar structures and or additional BTJ's created during a regrowth process that is independent of a first growth process with a VCSEL output determined in response to a monitoring application of the VCSEL, the VCSEL having an HCG grating and a bottom DBR. A housing of a smartwatch interior houses the VCSEL laser. The smartwatch includes one or more of a display, an optical sensor, one or more electrodes, SIM card slot, speaker, microphone, charging pins, and a band.

DETAILED DESCRIPTION

Figure 1A:
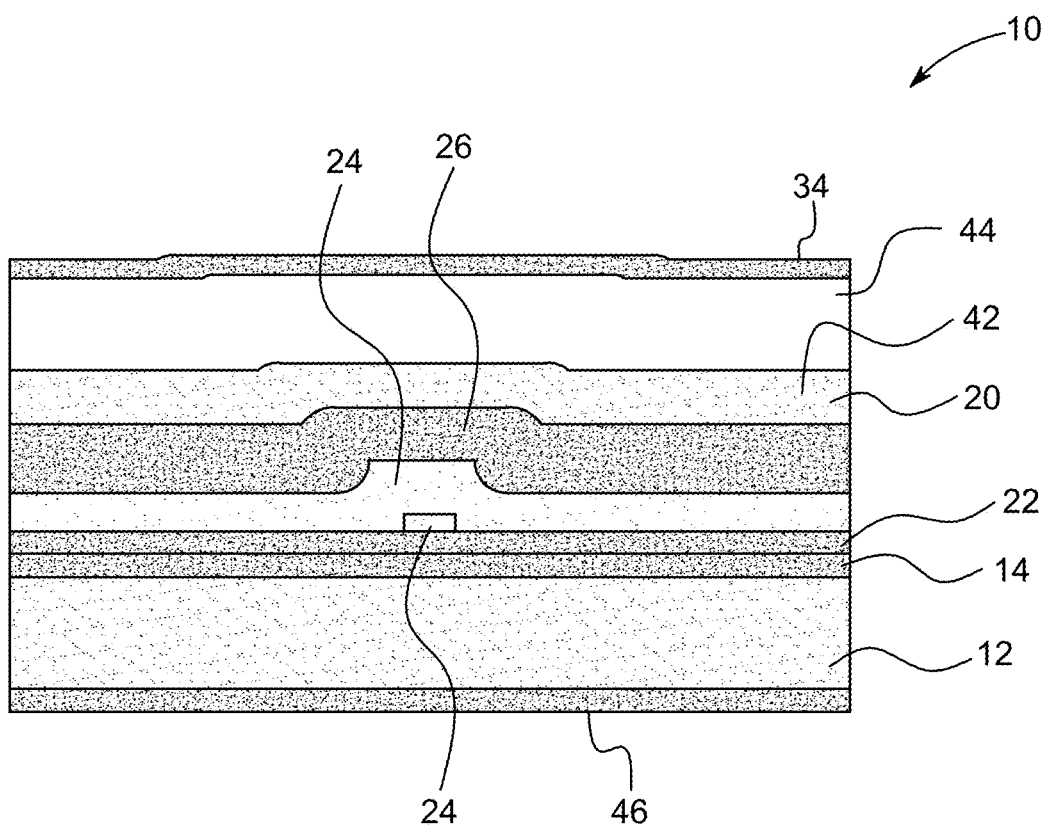
FIG. 1A illustrates one embodiment of a light emitting device of the present invention with a seed layer and HCG layer.
Figure 1B:
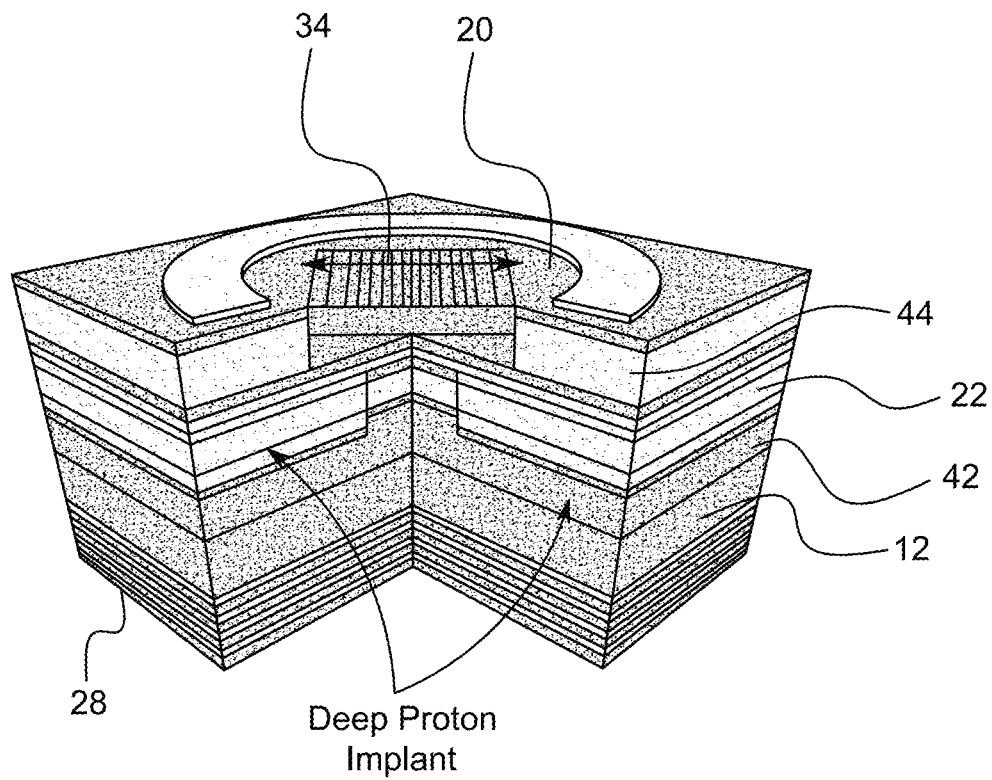
FIG. 1B illustrates an embodiment of FIG. 1A with a sacrificial layer and deep proton implant.
Figure 1C:
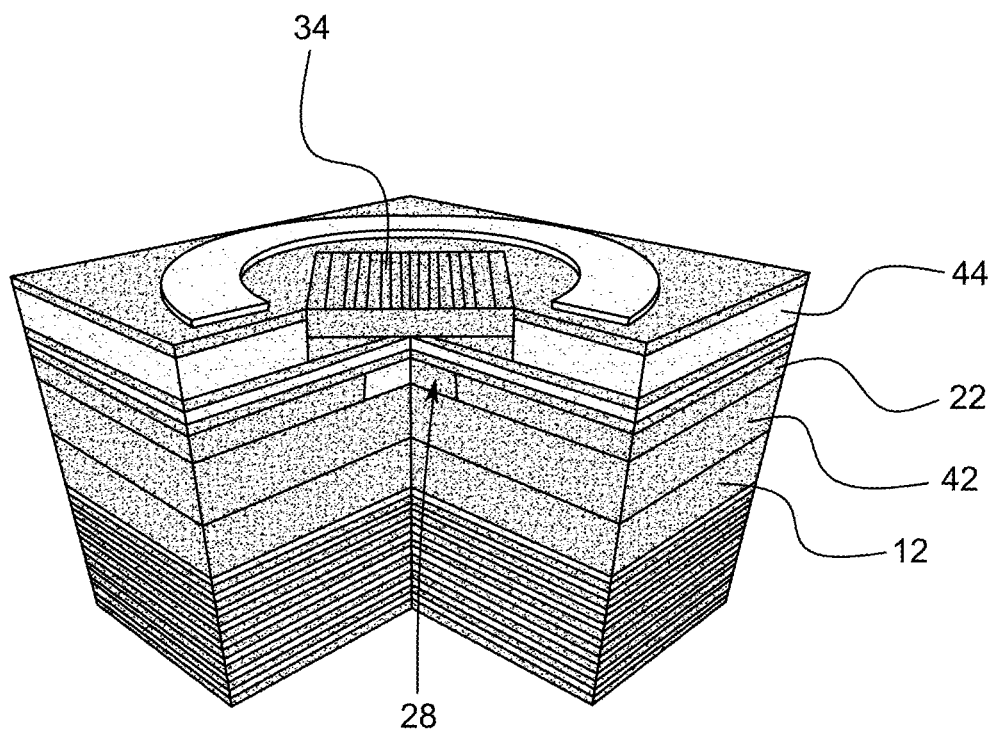
FIG. 1C illustrates the FIG. 1B embodiment with the deep proton implant but with a buried tunnel junction.
Figure 1D:
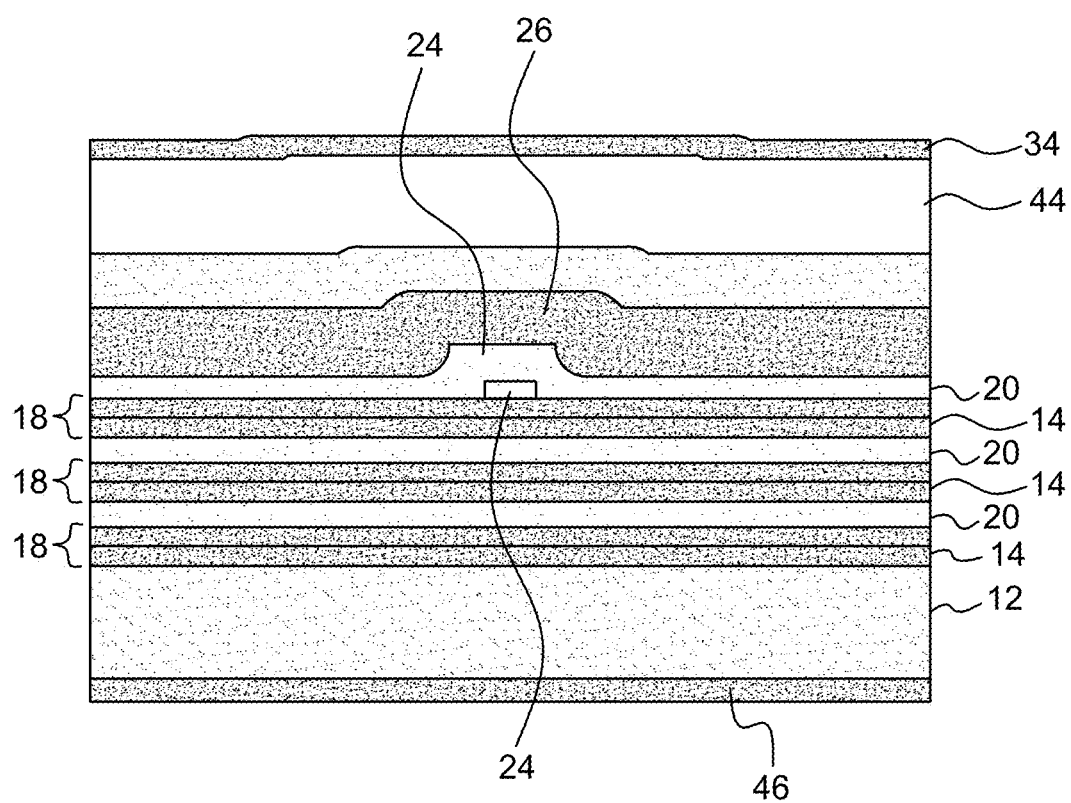
FIG. 1D illustrates one embodiment of a light emitting device of the present invention with multiple-junction HCG tunability.

As used herein, the term engine refers to software, firmware, hardware, or other component that can be used to effectuate a purpose. The engine will typically include software instructions that are stored in non-volatile memory (also referred to as secondary memory) and a processor with instructions to execute the software. When the software instructions are executed, at least a subset of the software instructions can be loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

As used herein a mobile device includes, but is not limited to, a cell phone, such as Apple's iPhone®, other portable electronic devices, such as Apple's iPod Touches®, Apple's iPads®, and mobile devices based on Google's Android® operating system, and any other portable electronic device that includes software, firmware, hardware, or a combination thereof that is capable of at least receiving a wireless signal, decoding if needed, and exchanging information with a server. Typical components of mobile device may include but are not limited to persistent memories like flash ROM, random access memory like SRAM, a camera, a battery, LCD driver, a display, a cellular antenna, a speaker, a BLUETOOTH® circuit, and WIFI circuitry, where the persistent memory may contain programs, applications, and/or an operating system for the mobile device. For purposes of this application, a mobile device is also defined to include a fob, and its equivalents.

As used herein, the term "computer" is a general-purpose device that can be programmed to carry out a finite set of arithmetic or logical operations. Since a sequence of operations can be readily changed, the communication device can solve more than one kind of problem. A communication device can include of at least one processing element, typically a central processing unit (CPU) and some form of memory. The processing element carries out arithmetic and logic operations, and a sequencing and control unit that can change the order of operations based on stored information. Peripheral devices allow information to be retrieved from an external source, and the result of operations saved and retrieved. Communication device also includes a graphic display medium.

As used herein, the term "internet" is a global system of interconnected computer networks that use the standard Network Systems protocol suite (TCP/IP) to serve billions of users worldwide. It is a network of networks that consists of millions of private, public, academic, business, and government networks, of local to global scope, that are linked by a broad array of electronic, wireless and optical networking technologies. The internet carries an extensive range of information resources and services, such as the inter-linked hypertext documents of the World Wide Web (WWW) and the infrastructure to support email. The communications infrastructure of the internet consists of its hardware components and a system of software layers that control various aspects of the architecture.

As used herein, the term "extranet" is a computer network that allows controlled access from the outside. An extranet can be an extension of an organization's intranet that is extended to users outside the organization in isolation from all other internet users. An extranet can be an intranet mapped onto the public internet or some other transmission system not accessible to the general public, but managed by more than one company's administrator(s). Examples of extranet-style networks include but are not limited to:

LANs or WANs belonging to multiple organizations and interconnected and accessed using remote dial-up LANs or WANs belonging to multiple organizations and interconnected and accessed using dedicated lines Virtual private network (VPN) that is comprised of LANs or WANs belonging to multiple organizations, and that extends usage to remote users using special "tunneling" software that creates a secure, usually encrypted network connection over public lines, sometimes vian ISP.

As used herein, the term "Intranet" is a network that is owned by a single organization that controls its security policies and network management. Examples of intranets include but are not limited to: s LAN, a Wide-area network (WAN) that is comprised of a LAN that extends usage to remote employees with dial-up access, a WAN that is comprised of interconnected LANs using dedicated communication lines, a Virtual private network (VPN) that is comprised of a LAN or WAN that extends usage to remote employees or networks using special "tunneling" software that creates a secure, usually encrypted connection over public lines, sometimes vian Internet Service Provider (ISP).

For purposes of the present invention, the Internet, extranets and intranets collectively are referred to as ("Network Systems").

As used herein "Cloud Application" refers to cloud application services or "software as a service" (SaaS) which deliver software over the Network Systems eliminating the need to install and run the application on a device.

As used herein "Cloud Platform" refers to a cloud platform services or "platform as a service" (PaaS) which deliver a computing platform and/or solution stack as a service, and facilitates the deployment of applications without the cost and complexity of obtaining and managing the underlying hardware and software layers.

As used herein "Cloud System" refers to cloud infrastructure services or "infrastructure as a service" (IAAS) which deliver computer infrastructure as a service with raw block storage and networking.

As used herein "Server" refers to server layers that consist of computer hardware and/or software products specifically designed for the delivery of cloud services.

As used herein, the term "user monitoring": (i) cardiac monitoring, which generally refers to continuous electrocardiography with assessment of the user's condition relative to their cardiac rhythm. A small monitor worn by an ambulatory user for this purpose is known as a Holter monitor. Cardiac monitoring can also involve cardiac output monitoring vian invasive Swan-Ganz catheter (ii) Hemodynamic monitoring, which monitors the blood pressure and blood flow within the circulatory system. Blood pressure can be measured either invasively through an inserted blood pressure transducer assembly, or noninvasively with an inflatable blood pressure cuff. (iii) Respiratory monitoring, such as: pulse oximetry which involves measurement of the saturated percentage of oxygen in the blood, referred to as $SpO2$, and measured by an infrared finger cuff, capnography, which involves $CO2$ measurements, referred to as $EtCO2$ or end-tidal carbon dioxide concentration. The respiratory rate monitored as such is called AWRR or airway respiratory rate). (iv) respiratory rate monitoring through a thoracic transducer belt, an ECG channel or via capnography, (v) Neurological monitoring, such as of intracranial pressure. Special user monitors can incorporate the monitoring of brain waves electroencephalography, gas anesthetic concentrations, bispectral index (BIS), and the like, (vi) blood glucose monitoring using glucose sensors. (vii) childbirth monitoring with sensors that monitor various aspects of childbirth. (viii) body temperature monitoring which in one embodiment is through an adhesive pad containing a thermoelectric transducer. (ix) stress monitoring that can utilize sensors to provide warnings when stress levels signs are rising before a human can notice it and provide alerts and suggestions. (x) epilepsy monitoring. (xi) toxicity monitoring, (xii) general lifestyle parameters, (xiii) sleep, including but not limited to: sleep patterns, type of sleep, sleep disorders, movement during sleep, waking up, falling asleep, problems with sleep, habits during, before and after sleep, time of sleep, length sleep in terms of the amount of time for each sleep, body activities during sleep, brain patterns during sleep and the like (xiv) body gesture, movement and motion (xv) body habits, (xvi) and the like.

As used herein, a smartwatch is a wearable computer and may refer to any device that is worn, adhered to, or positioned on or within the body of the user including bands, sensor modules, anklets, straps, stickers, or other devices. For example, the smartwatch may represent any number of smart wearables that are integrated with or connected to an attachment mechanism, such as a band, strap, sticker, clothing, or so forth. The smartwatch may be worn on the user's wrist, arm, head, neck, leg, chest, shoulder, or so forth.

Figure 2:
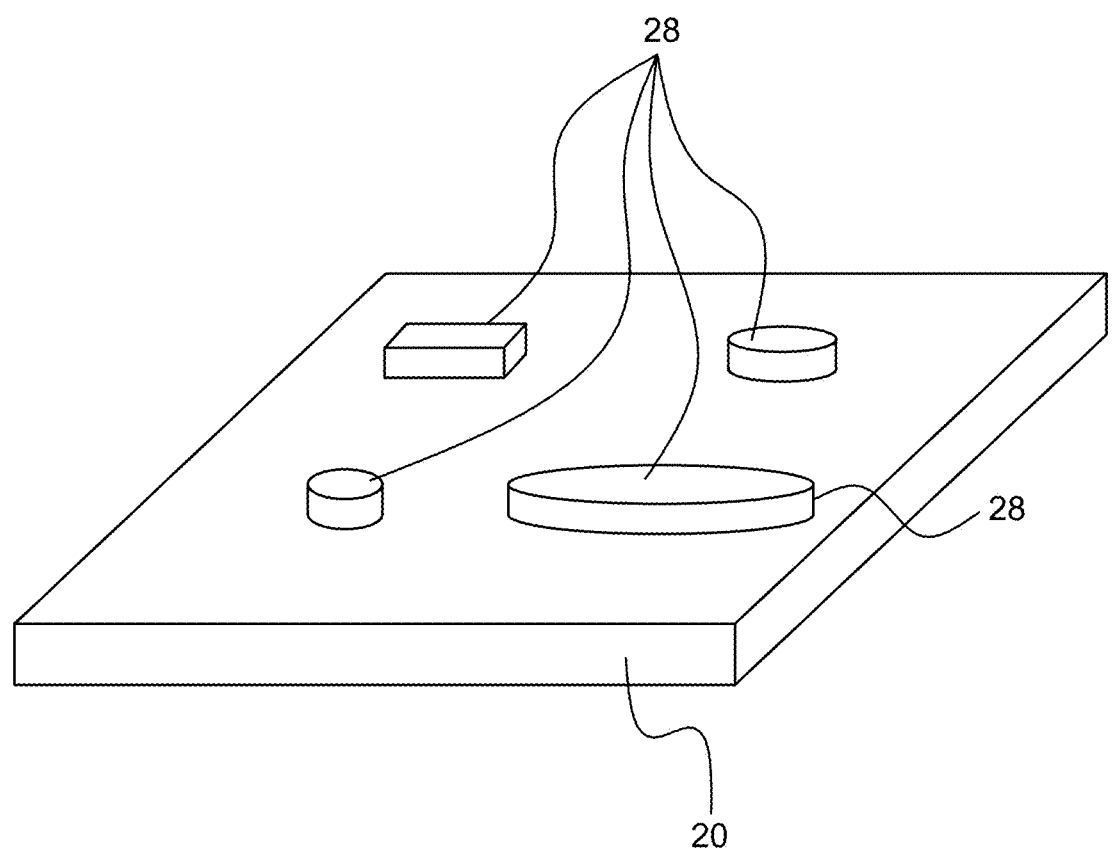
FIG. 2 illustrates an embodiment with several stepped BTJ apertures with different geometric shapes.
Figure 3:
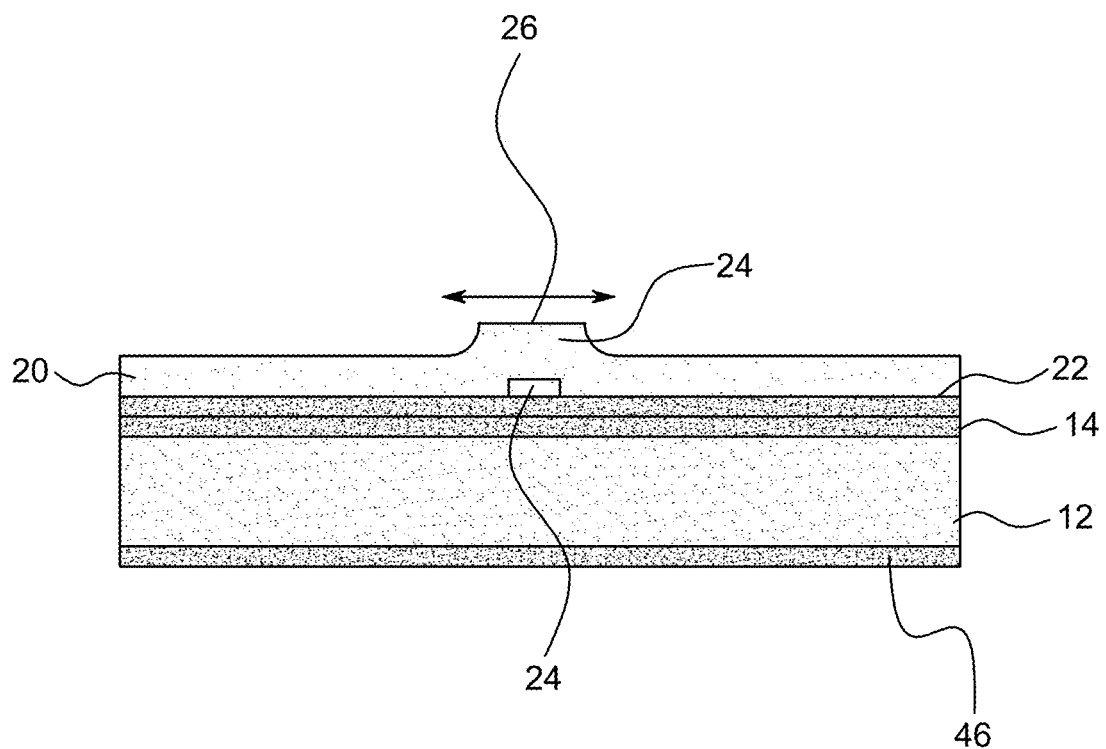
FIG. 3 illustrates a shaped structure, which can be a plateau, of the present invention.

In one embodiment, illustrated in FIGS. 1A-1D, a light emitting device 10 includes:

a first mirror 12 ("DBR"), which can be a bottom mirror, and one or more active regions 14. A first active region 14 is adjacent to the first mirror 12. The one or more active regions 14 are stacked in the light emitting device 10 to provide for a selected shape structure 26 with an active region that includes a tunnel junction (TJ) 20, another active region 14, another TJ 20 and so on. As illustrated in FIG. 2 there can be a repetition of active regions 14 and TJ's 20, providing a plurality of successive active regions 14 with TJ's 20, as illustrated in FIG. 2. Each active region 14 includes quantum wells and barriers 16 surrounded by one or more p-n junctions 18, see FIG. 3. As previously recited, one or more TJ's 20 are provided. Each of an aperture 24 is provided with a selected shaped structure 26, illustrated in FIG. 4. As non-limiting examples, the selected shape structure 26 can be open or closed, geometric or non-geometric shape, and the like. The shape of the selected shape structure 26 is based on a desired optical transmission function for a desired application, as shown in FIG. 4

Figure 4:
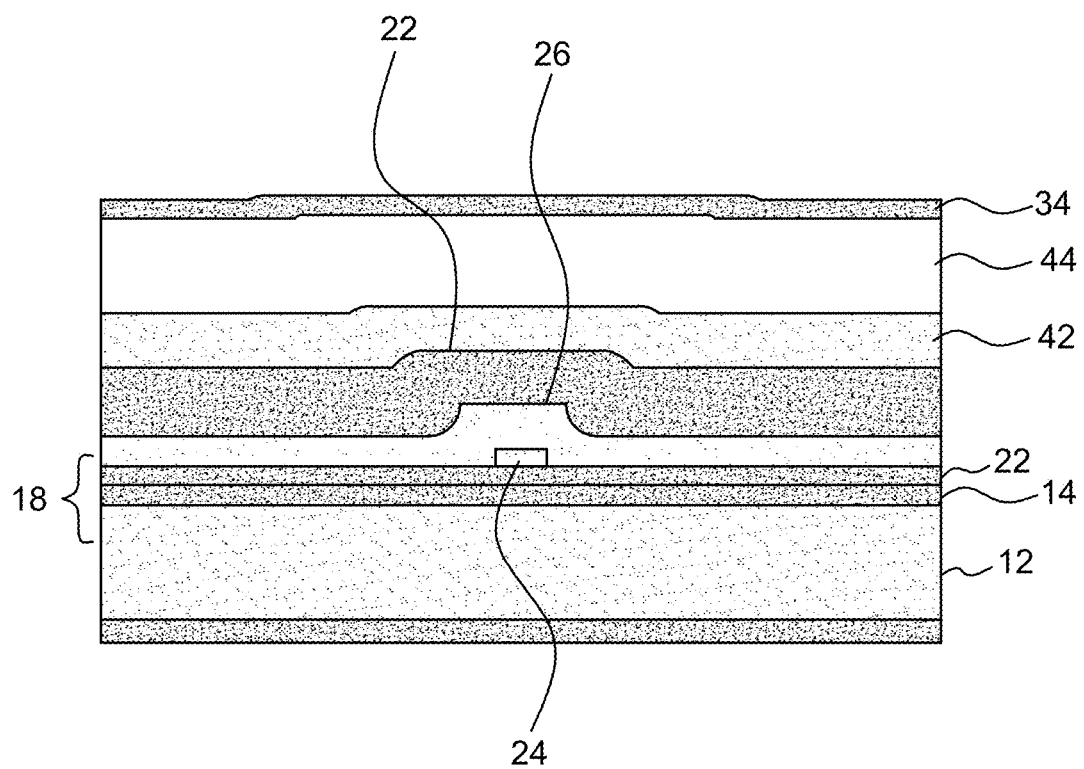
FIG. 4 illustrates one embodiment of a P-N junction.

In one embodiment, the selected shape structure 26 is a stepped structure, see FIG. 4. The degree of the stepping can be at a variety of different angles, as determined by the etching process. The selected shape structure 26 can be substantially any geometry, including but not limited to a four corned star, circular, square and the like. As a non-limiting example, the selected shape structure 26 can be created using an inverse design. The selected shape structure 26 is selected in order to create an optimal desired far field pattern depending on the desired application. As a non-limiting example, the selected shape structure 26 is formed by etching.

In one embodiment, a first growth is used to create the bottom mirror 12, TJs 20, active regions 14, and the like. In one embodiment, a selected geometric configuration buried tunnel junction 28 is created during a regrowth process. The light emitting device 10 is created by the first growth, followed by a second or regrowth of the first growth. The first growth creates a planar structure. Additional BTJ's 28 are created from second, third and the like regrowth's. The creation of multiple BTJ's is formed during multiple regrowth processes. All of these regrowth's are independent of the first growth process.

An area 30 is defined by the one or more BTJ's 28, additional TJ's 20, planar structures and/or addition BTJ's 28. A vertical resonator cavity 32 is defined by a second mirror over the electrical confinement aperture 30, see FIG. 6. A high contract grating (HCG) 34 operates as a second mirror positioned at the top of the vertical resonator cavity 32.

Figure 5:
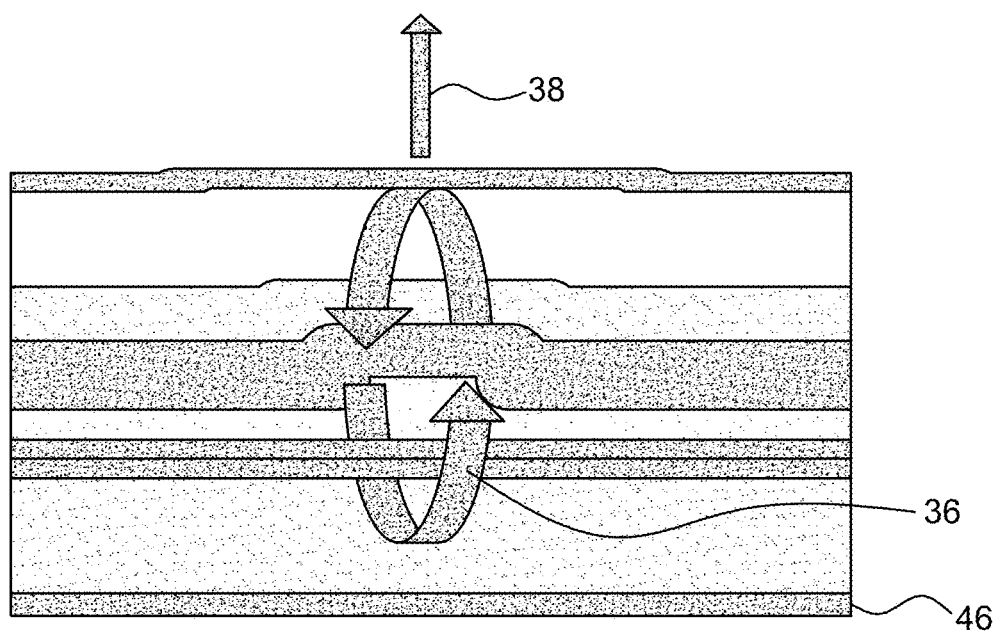
FIG. 5 illustrates an embodiment of FIG. 1A with an output beam and an optical beam inside of a cavity.
Figure 6:
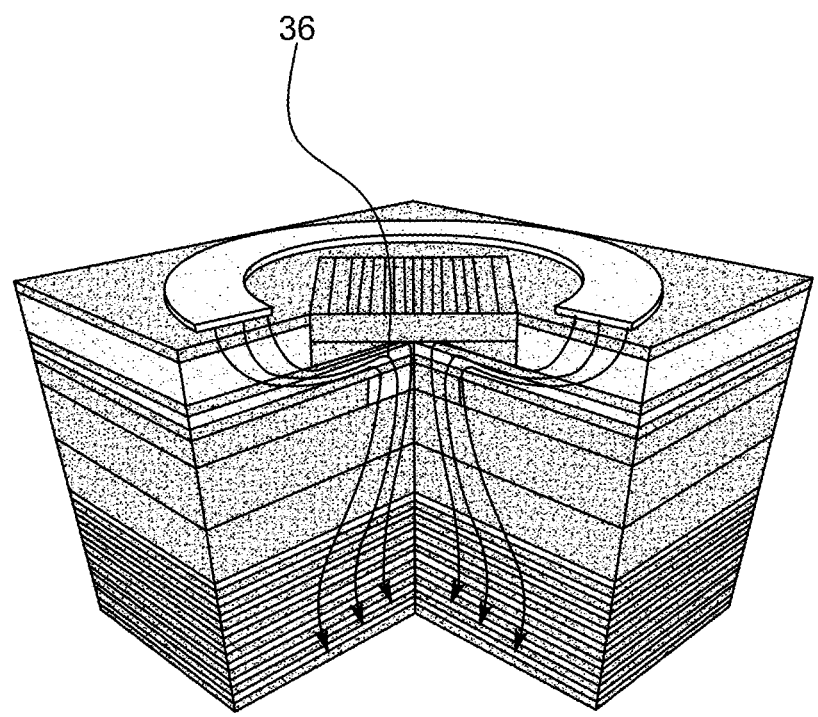
FIG. 6 illustrates one embodiment of electrical current confinement through a BTJ aperture, where electrical current flow from a top to a bottom contact.
Figure 7:
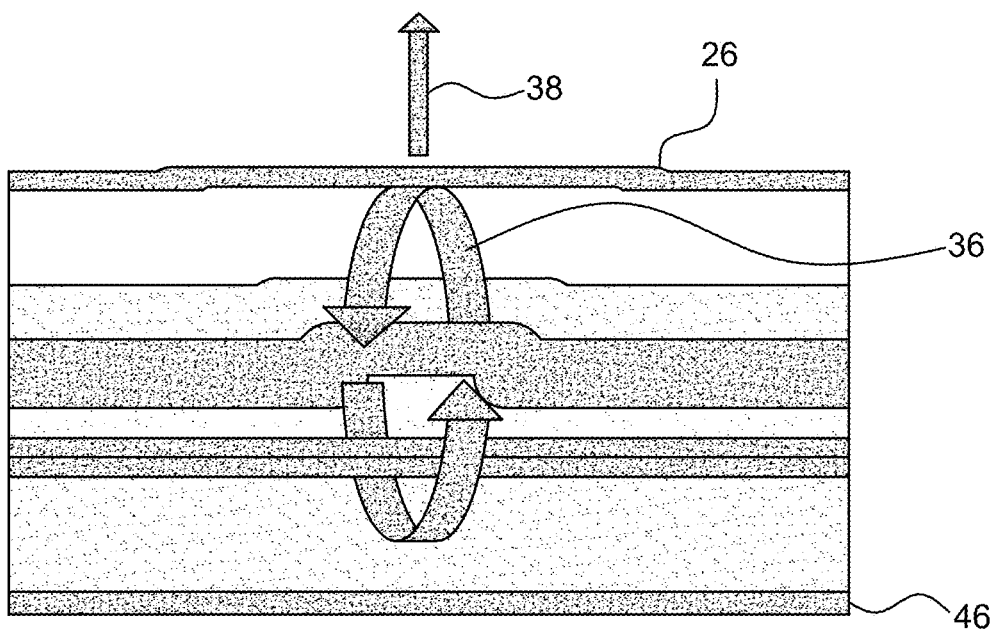
FIG. 7 is similar to FIG. 3, but with a planarized HCG final layer.
Figure 8:
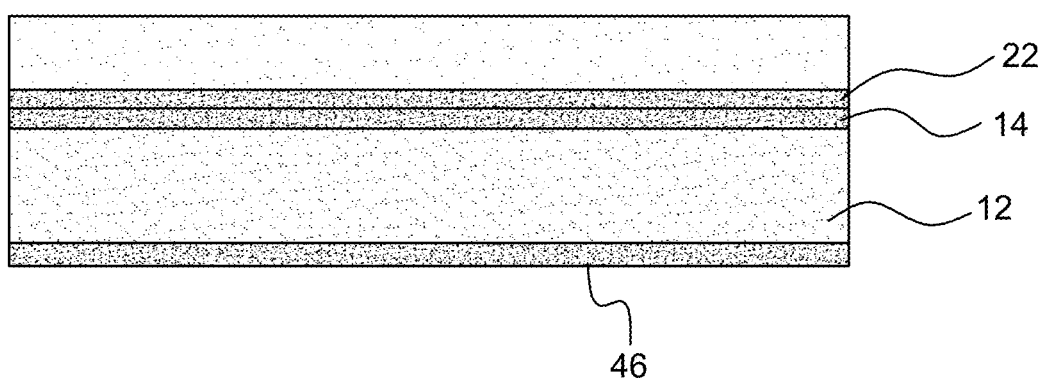
FIG. 8 illustrates one embodiment of a manufacturing sequence with a growth of a bottom, a timed etch of the TJ, leaving some p++, and a regrowth on top of a VCSEL from an etched seed layer.
Figure 9:
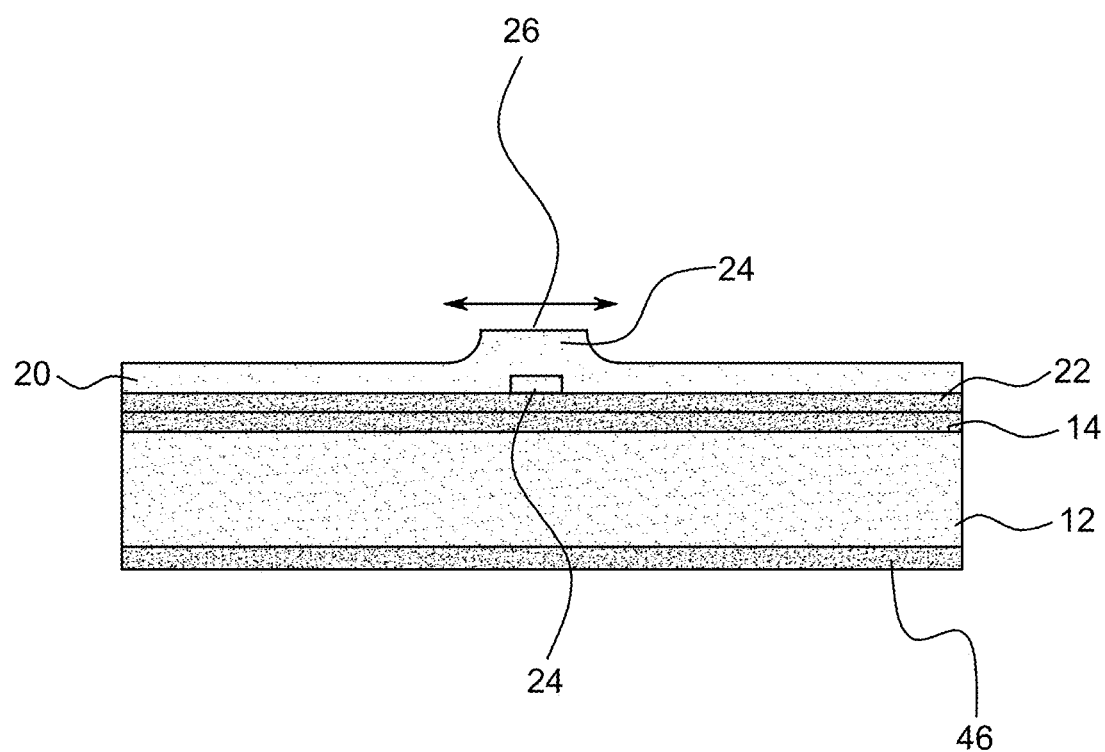
FIG. 9 illustrates one embodiment of a manufacturing sequence with a timed slow etch.
Figure 10:
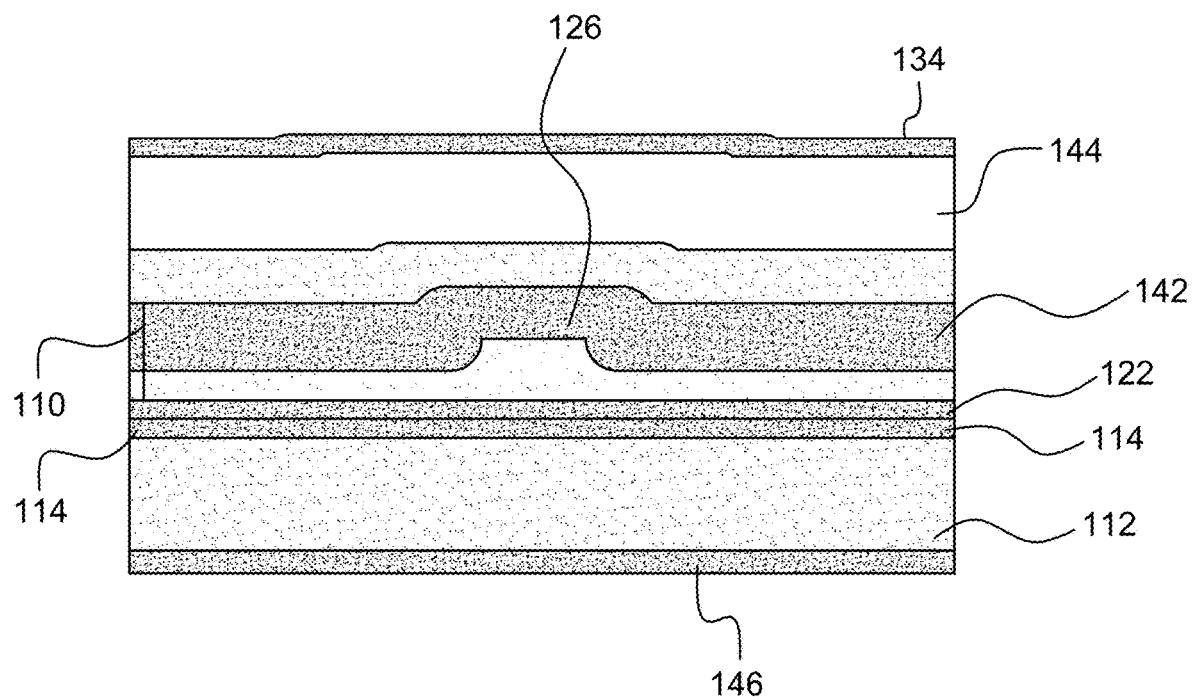
FIG. 10 illustrates one embodiment of a manufacturing sequence with a regrowth of n-InP with grading, and a regrowth of a top DBR, sacrificial layer and HCG layer.

In one embodiment, the HCG 34 conformally covers the selected shape structure 26 layered on the selected shape structure 26. The HCG 34 remains anchored by a variety of different methods including not limited to: a membrane, or membrane structure, by beams after partial removal of sacrificial layer in order to move with respect to the optical resonator and modify a cavity length and consequent wavelength emitted by light emitting structure, and the like. A shape of the output beam 38, as in FIGS. 5 and 6, is determined by a geometric shape of the one or more BTJ apertures 29, and the apertures for additional TJ's 20, planar structures and/or additional BTJ's 28. and a transmission function of the HCG 34. HCG 34 is designed according to a desired optical transmission function for a desired application.

As a non-limiting example, the HCG 34 operates as a second mirror positioned over the vertical resonator cavity 32. In one embodiment, a shape of the output beam of light emitting device 10 is determined by a geometric shape of the one or more BTJ apertures 29, and apertures for additional TJ's 20, planar structures and/or additional BTJ's 28.

As a non-limiting example, the far field transmission range is application dependent. As a non-limiting example, the output beam can be a plurality of different geometries including but not limited to circular, elliptical and the like.

The selected shape structure can be created by a variety of ways. As non-limiting examples, the selected shape structure can be created can be made with a grid, a circular array of dots, a screen, hole and screens, and the like.

In one embodiment, the light emitting device 10 is a VCSEL (hereafter referred to as ("VCSEL 10").

Relative to efficiency, the VCSEL 10 can be designed to maximize the light output relative to the desired application. Additionally, the number of BTJ's 28 created can be in response to the application.

In one embodiment, a shape of the output beam 38 is configured from a design of the electrical confinement aperture 30. As a non-limiting example, a geometry of the electrical confinement aperture 30 is slightly asymmetric to provide that the beam 36 inside the VCSEL 10 provides a Gaussian beam shape as the output beam 38 from the HCG 34.

In one embodiment, a coupling loss of the output beam 38 to a fiber or wavelength is reduced when VCSEL output beam 38 is designed to match the fiber modes. As a non-limiting example, the HCG 34 controls one or more of: an output beam 38 polarization, optical beam 3 shape and a single longitudinal wavelength. As a non-limiting example, the HCG 34 is further released from selected shape structure 26 by selective etch of spacing layers 22. In one embodiment, p-doping is on a top of the active region 14 leading to n-doping to a bottom of active region 14.

In one embodiment, at least a portion of the spacing layers 22 above the one or more BTJ apertures 29, the apertures for additional TJ's 20, planar structures and/or addition BTJ's 28, have thicknesses defined as multiples of quarter-wavelength of target lasing wavelength, in one embodiment, spacing layers and the top DBR 42 can have different thickness. As a non-limiting example, the top DBR 42 has a smaller number of layers than the bottom DBR.

Spacing layers 22 can also be used for electrical current spreading, thermal dissipation, or minimizing optical absorption, for example, but not limited to those ends.

In one embodiment, a top DBR 42 is not included in VCSEL 10. The sacrificial layer 44 of semiconductor material is removed via etching at specific locations in order to release the top mirror tuning structure. In one embodiment, the etching of the sacrificial layer 44 uses a wet or dry etch process. The sacrificial layer 44 can remain when the top mirror is not moveable as a non-tunable design and has a low index of refraction compared to a material of the top DBR 42. Successive steps are used in the growth of the VCSEL 10 and can also provide lateral optical confinement due to a graded lens effect. An epitaxial growth and a regrowth of the VCSEL 10 is achieved In one embodiment, HCG 34 is formed of a semiconductor epitaxial layer. HCG 34 is layered on a selected shape structure 26, that can be less than 100 nm. In one embodiment, VCSEL 10 produces a stable linearly polarized output defined by HCG 34. In one embodiment of the present invention, VCSEL 10 is created by a process of two independent epitaxial growths. In one embodiment, first and second epitaxial growth structures are characterized, and formed by epitaxial growth.

As a non-limiting example, the first epitaxial growth structure is on a seed substrate 46 of III-V semiconductor material and includes: the bottom mirror Distributed Bragg Reflector (DBR) 26 on a top surface of the seed substrate 46 is defined by alternate layers of high and low index of refraction. Active region, generally denoted as 24, is adjacent to first mirror 12, consisting of quantum wells and barriers 16. A plurality of layers 22 can be optional. The final layer, and the at least one TJ 20, are etched laterally to define an etched electrical confinement aperture 30 through which an electrical current flow. The HCG 34 and spacing layers 22 are formed over in a stepped format (selected shape structure 26). The etched electrical confinement aperture 30 being the one or more BTJs 28 that is a selected shape structure 26, as a result of further regrowth.

As a non-limiting example, the one or more BTJS 28 provide for VCSEL 10 current confinement in a VCSEL 10, and can be implemented for any VCSEL 10 in the SWIR band, from 650 to 1800 nm. More particularly, this can for InP based VCSELs 10 (above 1300 nm).

In one embodiment, for current confinement, the VCSEL 10 of the present invention uses the one or more BTJ's 28, additional TJ's 20, planar structures and/or addition BTJ's 2, instead of ion implant or oxide aperture.

As a non-limiting example, the VCSEL 10 with the one or more BTJ's 28, a BTJ 28 and can provide better current blocking outside of electrical confinement aperture 30 than ion implanted apertures and also provide good reliability.

In one embodiment, of the first epitaxial growth structure, the top surface of the seed substrate 46 is defined by alternate layers of high and low index of refraction.

In one embodiment, of the first epitaxial growth structure, the active region 14 is a source of light from an electrooptic effect due to a recombination of holes and electron. As a non-limiting example, the active region 14 is undoped and surrounded by one or more p-n junctions in order to promote recombination of electrons-holes.

In one embodiment, of the first epitaxial growth structure, at least a portion of the plurality of spacing layers 22 have a varied thicknesses depending on an optical design. In one embodiment, at least a portion of the plurality of spacing layers 22 are adjacent to the active region 14 or to additional spacing layers 22.

In one embodiment of the first epitaxial growth structure, the TJ 20 is a highly doped p++ layer directly on the top of a highly doped n++ layer.

In one embodiment of the first epitaxial growth structure, final layer is made of a same material of the seed substrate 46.

In one embodiment of the first epitaxial growth structure, the final layer is not included, depending on the optical design.

The TJ 20 layer is etched laterally and defines the selected shape structure 26, that is chosen based on the application. This becomes the one or more BTJs 28, a BTJ 28 additional TJ's 20, planar structures and/or addition BTJ's 28.

In one embodiment, a second epitaxial growth structure starts on a top of the first epitaxial growth structure after TJ 20 lateral etch. In one embodiment, the second epitaxial growth structure is a regrowth on top of the first stepped epitaxial growth structure, creating the one or more BTJs 28 from the one or more TJs 20, This becomes the one or more BTJs 28, additional TJ's 20, planar structures and/or addition BTJ's 28.

In one embodiment, the second epitaxial growth structure includes: spacing layers 22; an optional top DBR 42 mirror; a sacrificial layer; a top layer, which supports the top mirror manufacturing; and extra layers for supporting metal contacts.

In one embodiment, the p-doping is on a top of the active region 14 leading to n-doping to the bottom of the active region 14. In one embodiment, this is reversed and the n-doping is on the top of the active region 14, the p-doping is on the bottom.

In one embodiment of the second epitaxial growth structure, the second epitaxial growth structure starts on a top of the previously processed semiconductor stack.

In one embodiment of the second epitaxial growth structure, the second epitaxial growth structure includes spacing layers 22. As a non-limiting example, these spacing layers 22 have a varied thickness depending on the optical design.

In one embodiment of the second epitaxial growth structure, the spacing layers 22 are above the etched TJ 20 aperture. In one embodiment, the etch of the TJ 20 can be etching into the layers below the TJ 20. The TJ 20 and the layers below it can be fully etched, partially etched and the like. As a non-limiting example, the profile of the etch can be based of the selected application, and sidewalls can be created with sidewall angles of 20 to 90 degrees. the sidewalls of the etch can be created based on etching recipe, RF power, the type of chemicals used, crystal dependence, as well the desired end application. In one embodiment of the second epitaxial growth structure, they are added to complete a multiple of quarter-wavelength of a target lasing wavelength. In one embodiment, they have different thickness. In one embodiment, the spacing layers 22 are also used for electrical current spreading, thermal dissipation, or minimizing an optical absorption, and the like.

In one embodiment of the second epitaxial growth structure, the second epitaxial growth structure has a possible top DBR 42 mirror on top of a seed substrate 46, defined by alternating layers of high and low index of refraction of semiconductor. This top DBR 42 is not mandatory and, as a non-limiting example, has a much smaller number of layers when compared to bottom DBR 26, if it is included in the stack, and optimized based on the application, as well as two beam parameters. In one embodiment, the two beam parameters are reflectivity and the wavelength bandwidth of the mirror.

In one embodiment of the second epitaxial growth structure, the second epitaxial growth structure can be application specific, and include specific spacing sacrificial layer of semiconductor material under top mirror. This can be removed via etching at specific locations in order to release the top mirror tuning structure. In various embodiments, the etching of the sacrificial layer can be achieved with a wet or dry etch process. In one embodiment, this layer can alternatively remain in the structure if the top mirror is not supposed to move (non-tunable design) and has a low index of refraction compared to the top mirror material. In one embodiment, the index of refraction is application and can be as large as possible.

In one embodiment of the second epitaxial growth structure, the top mirror layer is processed during a post regrowth using an etching process and becomes a periodic structure designed to resonate and work as a mirror at specific wavelengths.

In one embodiment, the periodic structure is a high contrast metastructure (HCM) or high contrast grating HCG 34, known as subwavelength grating, or a photonic crystal structure. In one embodiment, the mirror effect requires a lower or a same index of refraction around the periodic structure, which can be air, if released, or other semiconductor or dielectric material, if not released. When it is a tunable structure, the periodic structure is actuated in order to change the optical length of optical cavity vian external input that causes movement of the periodic structure. In one embodiment, an external input is based on thermal, electrostatic or piezoelectric excitation. In one embodiment of the tunable design, tunability can also be achieved by heating the VCSEL 10 or changing its driving current.

In one embodiment of the second epitaxial growth structure, the second epitaxial growth structure extra layers are provided that are designed for supporting metal contacts.

In various embodiment, VCSEL 10 is at least one of: an air-cavity-dominant (ACD) or a semiconductor-cavity-dominant (SCD) design. In one embodiment, the regrowth process is configured to be nearly conformal and increase the lateral dimension of initial BTJ step as defined by the electrical confinement aperture 30 during deposition of epitaxial layers in the second epitaxial regrowth, in one embodiment, the regrowth process decreases a height of this step as more and more layers are added. In one embodiment, at the end, the periodic structure for the first mirror 12 is defined on a selected shape structure 26, which, however, does not have to be necessarily a plane.

As non-limiting examples, the successive steps can provide for lateral optical confinement due to a graded lens effect and improve overall efficiency of VCSEL 10.

In one embodiment, the epitaxial growth and regrowth of the VCSEL 10 can be achieved by conventional III-V epitaxy, such as molecular beam epitaxy (MBE) or metallo-organic chemical vapor deposition (MOCVD) or other techniques including but not limited to LPE, SPE and the like. While MBE can provide better control of each atomic layer, MOCVD can provide a better step coverage.

The HCG 34 can provide strong polarization control since the grating, HCG 34, acts as a polarizer, i.e., only stable linear polarization is transmitted through the grating, HCG 34, In one embodiment, the non-planar structure is formed due to the regrowth process which is started on selected shape structure 26 with TJ 20 delimited by a top of a selected geometric structure, including but not limited to a mesa.

In one embodiment, the one or more BTJ apertures 29 that are created during one or more regrowth's. After regrowth, etched TJ 29 becomes BTJ 20, a buried TJ.

In one embodiment, the HCG 34 is configured to reflect a first portion of light 36 back into the vertical resonator cavity 32. A second portion of light 38 is transmitted as an output beam from the light emitting structure 10. As a non-limiting example, every time the first portion of light 36 is reflected into the vertical resonator cavity 32, portions of light, constituting the second portion of light 38, come out of the light emitting structure 10. As a non-limiting example, the first portion of light 36 bounces around the vertical resonator cavity 36, with a portion coming out as the second portion of light 38.

As a non-limiting example, after sufficient thick regrowth, selected shape structure 26 can become planar, a plane plateau, and the like. It can easier to control processing of the periodic structure. In one embodiment, HCG 34 can be manufactured on a curved of stepwise layer, as far as continuous. In one embodiment, a final dimension of the plane plateau is originated from the epitaxial growth on top of electrical confinement aperture 30 and depends on a thickness of intermediary layers and growth conditions. As a non-limiting example, this thickness can be in the range of 10 um to 20 um for a starting electrical confinement aperture 30 with a 3-um diameter.

In one embodiment, VCSEL 10 is integrated in line detector behind it for FMCW applications, where the reflected light reflects into the VCSEL, causing optical feedback. The detector behind the VCSEL detects power oscillations due to the feedback and the signal can be used to reconstruct the 3D environment.

In one embodiment, a photodetector is at a side of an air gap in s tuning cavity as a detector. As a non-limiting example, the semiconductor, to the side of the air gap in the tunable structure, act as the photodetector and collect scattered light from the HCG and VCSEL body interface due to non-idealities. This offers some advantage to the application in 1) because the photodetector is outside of the cavity and does not contribute any additional feedback, simplifying the signal processing.

In one embodiment, a sensing apparatus includes a VCSEL 10 including one or more active regions 14. Each active region 14 has quantum wells and barriers 16. Active regions 14 are surrounded by one or more p-n junctions, the one or more active regions including a selected shape structure each with a tunnel junction (TJ). One or more apertures are provided with the selected shape structure. One or more buried tunnel junctions (BTJ) 28 or oxide confine aperture, additional TJ's 20, planar structures and/or additional BTJ's 28 are created during a regrowth process that is independent of a first growth process. An output of VCSEL 19 is determined in response to an application of the light emitting device. In one embodiment, bottom DBR 12 can include an HCG and dielectric coating with one or more layers of the dielectric coating.

In one embodiment, the dielectric coating is a stack of high/low index layers As non-limiting examples, the dielectric coating can be a stack of 5-10, 6-10, 7-10, 10 high/low index pairs of dielectric. The dielectric provides a wider tuning range. This provides a broad wavelength mirror. In one embodiment, the top DBR mirror 42 is s a moveable mirror.

With tunable, a specific wavelength is targeted and VCSEL 10 remains at that wavelength. Changing cavity 32 size allows VCSEL 10 to move, and physically change the cavity 32 size for each application In one embodiment, wavelength locking control is provided. This requires an external reference including but not limited to a chip that taps the light. This is then coupled to a reference system. The reference system and the chip are external to the VCSEL In one embodiment, atomic plots are used for the reference system.

As non-limiting examples, ranges of output power can be: one additional active region (or junction) can add ~1× power, and the laser could become 2× more powerful. However, as it also adds extra heat coming from additional optical power inside cavity, efficiency goes down. Thus, by adding more junctions we can have more power but to the price that the laser cannot work continuously anymore. Typical multi-junction VCSELs work on pulsed mode and it's very hard to predict range of output power. As a rule of thumb, we can say that 2 junctions will have 2× more power on pulsed operation, 3 junctions 3×. As one increases the number of junctions, pulses have to become faster and intervals longer.

In one embodiment, the output power is from 1 milliwatt to 5 milliwatts per aperture. In one embodiment, multi junction devices have output powers of 10-20 milliwatts, 12-17 milliwatts, and 15 milliwatts. In one embodiment, the oxide confinement defines aperture 24 for electrical current confinement.

As a non-limiting example, a number of quantum wells can be the same in all junctions, but not necessarily. Individual quantum well design can also be slightly different in order to broaden spectral material gain and increase tuning range.

Method of VCSEL Formation

In one embodiment, a regular VCSEL apparatus 10 includes current injection via the one or more BTJs 28, TJ's 20, planar structures and/or additional BTJ's without ion implantation.

As a non-limiting example, VCSEL apparatus 10 includes one or more BTJ's 28 and is tunable. In one embodiment, formation of the one or more BTJ's 28 TJ's 20, planar structures and/or additional BTJ's, requires an etch of a TJ aperture and regrowth of a top semiconductor epitaxial structure. As a non-limiting example, the process results on a non-flat surface, not suitable for an HCG 34. Moreover, uneven surface and regrowth process causes additional strain which also prevents MEMS manufacturing. In one embodiment, this requires relaxation of epitaxial growth through careful design of regrowth and MEMS actuation on the non-planar surface.

In one embodiment, VCSEL 10 formation includes the steps of:
 (i) growing a semiconductor active cavity material consisting of a multi-quantum well layer stack sandwiched between bottom and top spacer regions, the top spacer region terminating with a p-layer and a p++/n++ tunnel junction grown on top of the p-layer, each of the p++- and p-layer presenting a p-type layer;
 (ii) etching the active cavity material formed in step (i) to form a top of a selected geometric structure such as a mesa, including at least the upper n++ layer of the tunnel junction emerging from the underlying p-type layer, thereby creating a structured surface of the active cavity material formed by the upper surface of the upper surface of the p-type layer outside a top of a selected structure such as a mesa;
 (iii) applying a wafer fusion between the structured surface of the active cavity material and a substantially planar surface of a n-type semiconductor layer of a first distributed Bragg reflector (DBR) stack, thereby causing deformation of the fused surface around a top of a selected structure such as a mesa, and defining an electrical confinement aperture 30 for electrical current flow therethrough, the electrical confinement aperture 30 including a top of a selected structure such as a mesa, surrounded by an air gap between the deformed fused surfaces and defining an active region 14 of the device;
 (iv) forming a second DBR stack on the surface of the active cavity material opposite to the structured surface;
 (v) forming ohmic contacts on the VCSEL device structure to enable the electrical current flow through the electrical confinement aperture 30 to the active region 14.

In one embodiment, VCSEL apparatus 10 is made with the following processes: epitaxial growth of VCSEL up to tunnel junction (TJ) layer 20; development of TJ etches; identify etchants compatible to the TJ design 20; and development of regrowth process.

Surface compatibility to regrowth—not all surfaces or all materials are suitable for seeding the regrowth process—there is a trade off in between the best design for the TJ 20 and a design good enough which is suitable for regrowth.

Regrowth has to be carried long enough in order to planarize the surface where HCG 34 is manufactured on one or more of: VCSEL regular processing; growth of bottom VCSEL and then: etch of TJ 20, leaving some p++-target is 5-10 nm and regrowth of top VCSEL from etched seed layer.

Then there is: a regrowth of n-InP with grading; a regrowth of top DBR 42 (if included in design), sacrificial layer and HCG 34; followed by standard VCSEL manufacturing.

Figure 11A:
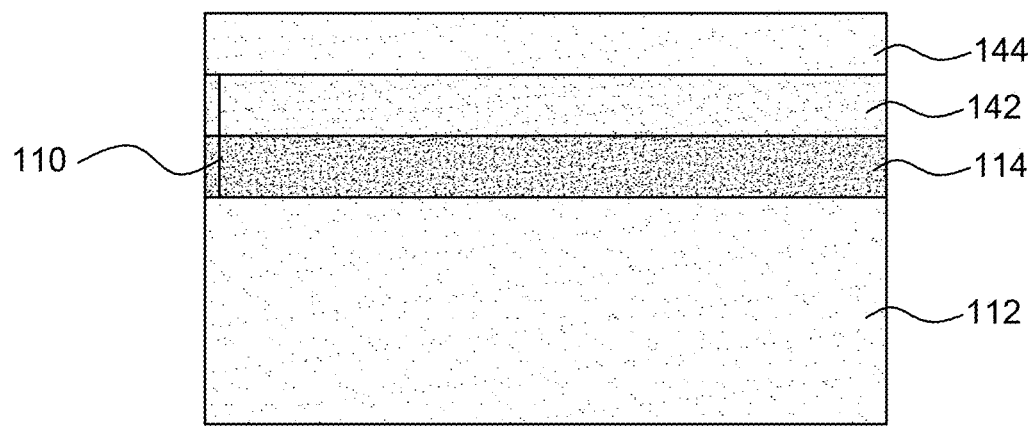
FIGS. 11A and 11B illustrate a first regrowth including a bottom DBR, active layer (region), top DBR and other spacing layers.
Figure 11B:
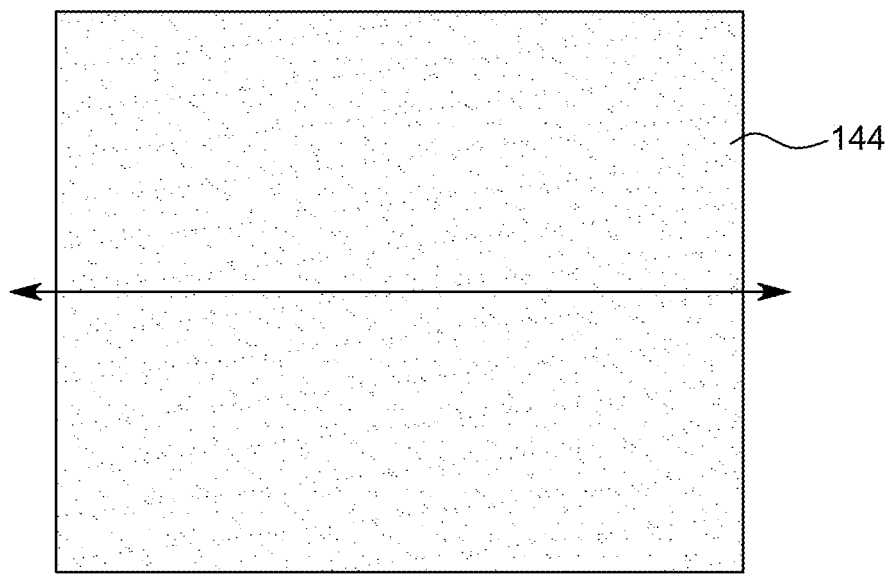
Figure 12A:
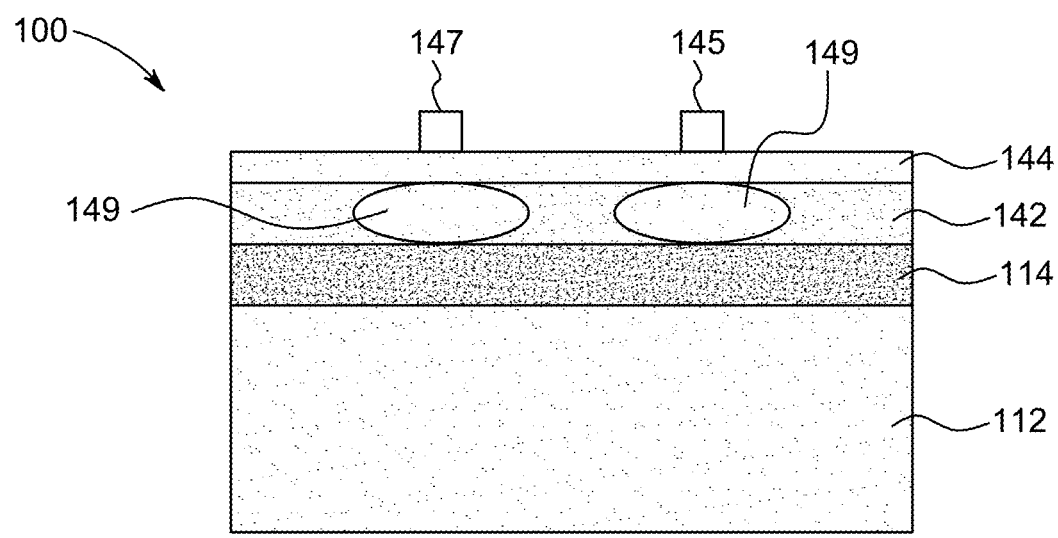
FIGS. 12A and 12B illustrates one embodiment of implantation.
Figure 12B:
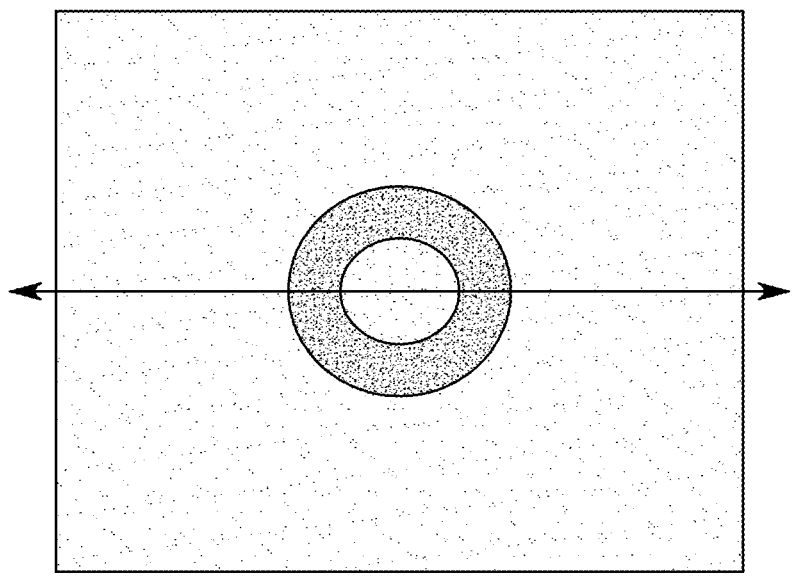

In one embodiment a regular VCSEL 10 epitaxial structure includes an etched post between an active region 112 and a sacrificial layer 114. FIGS. 11A and 11B illustrate a first regrowth including a bottom DBR 116, active layer (region) 112, top DBR 118/other spacing layers 120. The sacrificial layer 114 has a thickness now greater than 100 nm. The optical confinement is defined by the etched post 110 which acts as a waveguide. FIGS. 12A and 12B illustrates one embodiment of implantation.

In one embodiment, an etched post 110 and regrowth provide lateral current and optical confinement, small volume and increased efficiency for more demanding applications, such as very high-speed modulation and coherent communication. The increased efficiency is achieved because the optical wave and the lateral currents overlap.

Instead of etching the post 110 for confinement in the optical path via mesa etch and regrowth, the optical path is preserved and modify its boundaries for optical confinement. The existence of the sacrificial layer 114 in the present invention favors this new approach as the final interface of regrown material in the optical path is etched away. This preserves optical quality. As a non-limiting example, the manufacturing requires integration and compatibility of several different processes, not required for the conventional semiconductor as-grown DBR.

Regrowth of the sacrificial layer 114 around a small mesa 122 step brings much smaller complication when compared to previous approaches of buried heterostructures with steep walls more than 2× taller (3-4 um) than mesa 122 (0.8 um). In one embodiment, a full VCSEL is grown up to a thin SAC layer (100 nm of Al0.22Ga0.25In0.53As with 100 nm InP cap). As illustrated in FIGS. 12A and 12B implantation is then proceeded for current confinement under the metal contact pads. In illustrates the etched post 110.

Figure 13A:
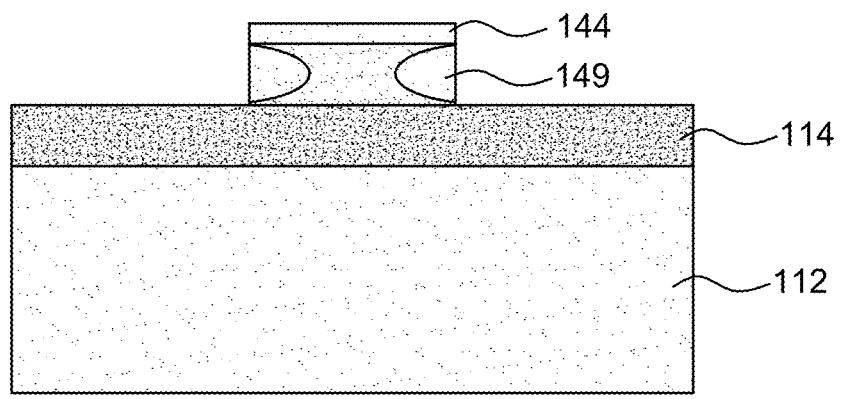
FIGS. 13A and 13B illustrate cross sections and top views of a mesa etch of the present invention.
Figure 13B:
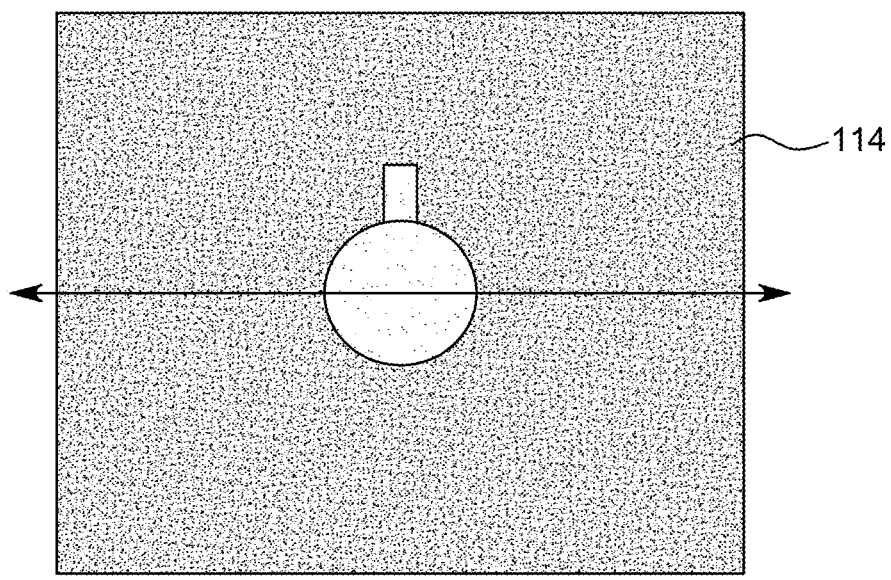
Figure 14A:
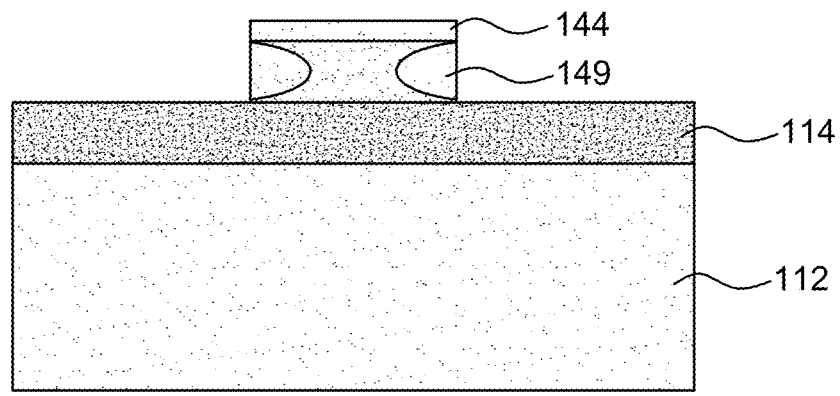
FIGS. 14A and 14B illustrate cross sections and top views of ALD wall protection for further selective etch on release, reliability, of the present invention.
Figure 14B:
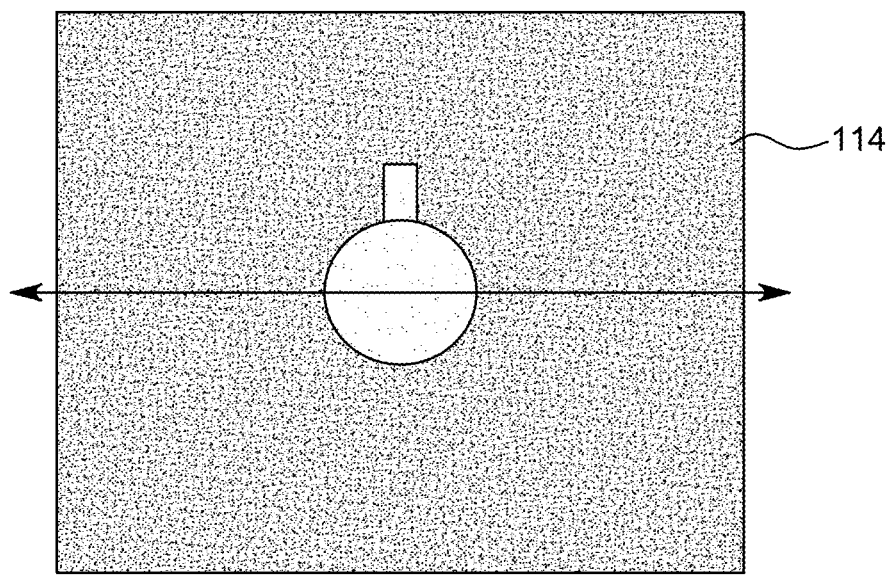

In one embodiment, implantation is done on a structure with the bottom DBR 116, active layer 112 and a thin sacrificial layer 114. The implantation is done on a layer between the active layer 112, and the sacrificial layer 114. An implant mask is used. The structure, including the bottom DBR 116, active layer 112, sacrificial layer 114 and mesa 122 position therebetween, is then dry etch down a very tiny mesa 122 for high-speed (radius of 5-10 um), up to InP layers, close to a TJ interface FIGS. 13A and 13B. The mesa 122 having an increasing radius up to a top layer. Optical monitoring can be used. Referring to FIGS. 14A and 14B, atomic layer deposition (ALD) is performed only on side walls of etched post 110. This protects the etched post 110 from further release, increased reliability and isolation from surrounding air.

Figure 15A:
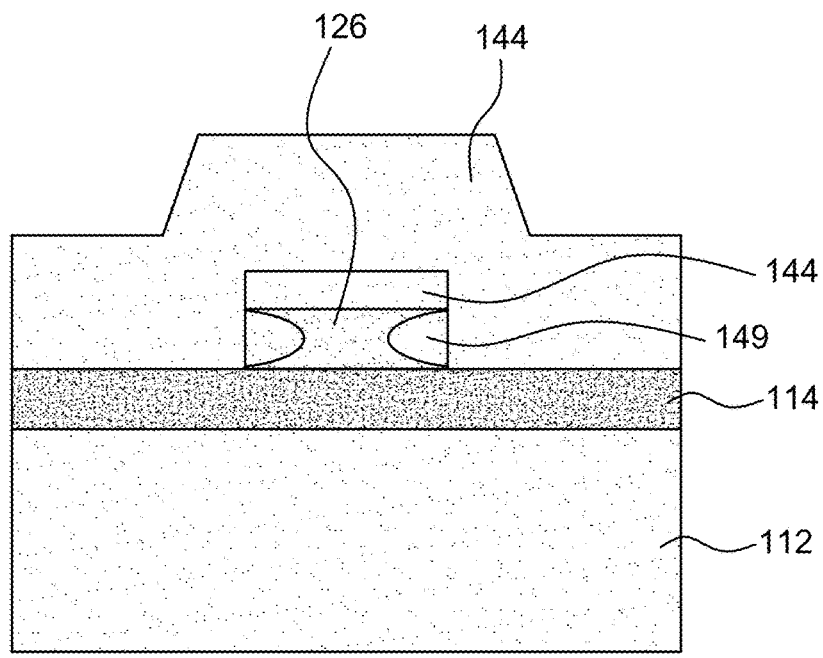
FIGS. 15A and 15B illustrate cross sections and top views of InP growth of the present invention.
Figure 15B:
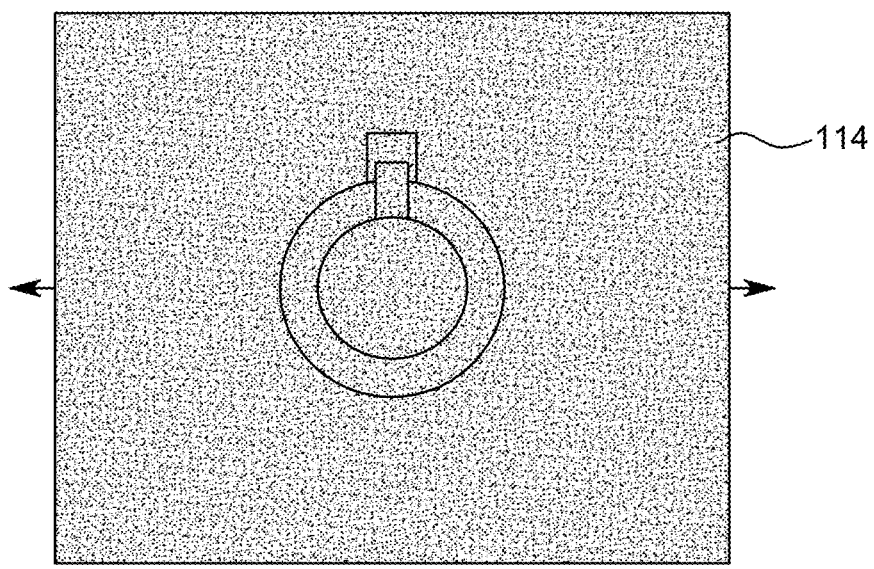

In one embodiment, illustrated in FIGS. 15A and 15B, ALD wall protection is used for further selective etch on release, and for reliability.

Figure 16A:
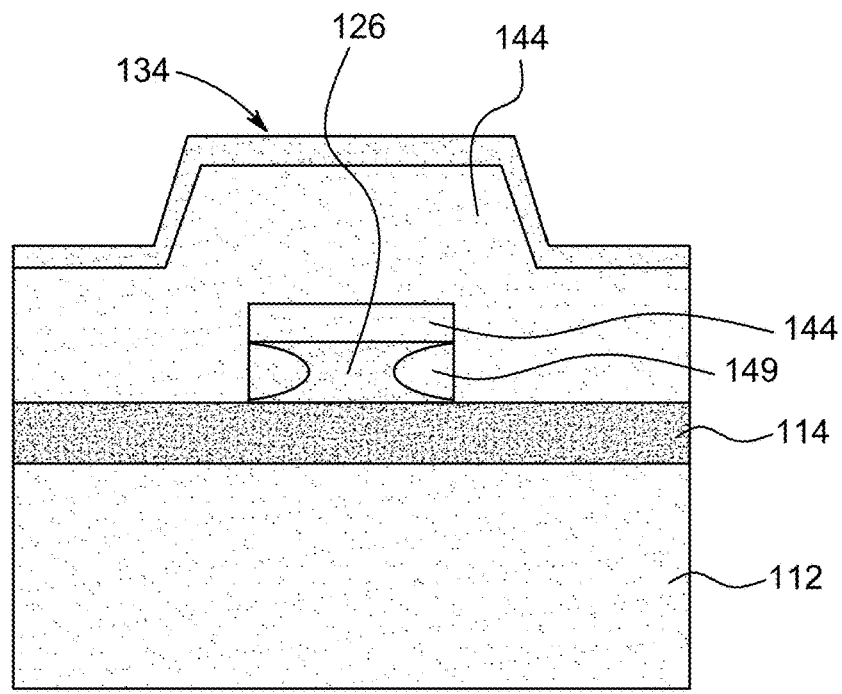
FIGS. 16A and 16B illustrate cross sections and top views of the HCG layer of the present invention.
Figure 16B:
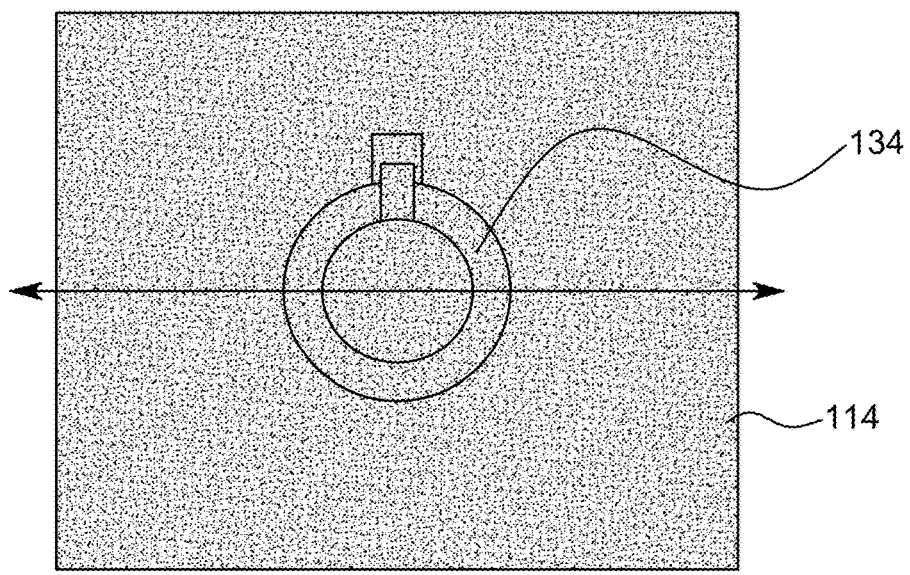

A full regrowth of a full sac layer+HCG on top is performed, as illustrated in FIGS. 16A and 16B, with the interface etched away. InP regrowth is a regrowth around the etched post 110. This is later removed, along with the sacrificial layer 114.

Figure 17A:
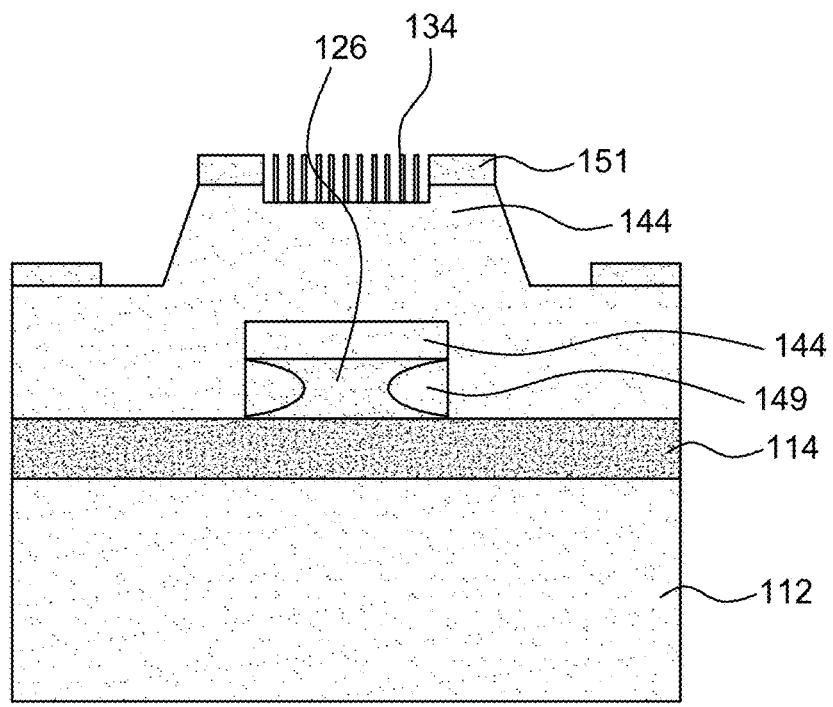
FIGS. 17A and 17B illustrate cross sections and top views of the HCG/MEMS litho/dry Etch of the present invention.
Figure 17B:
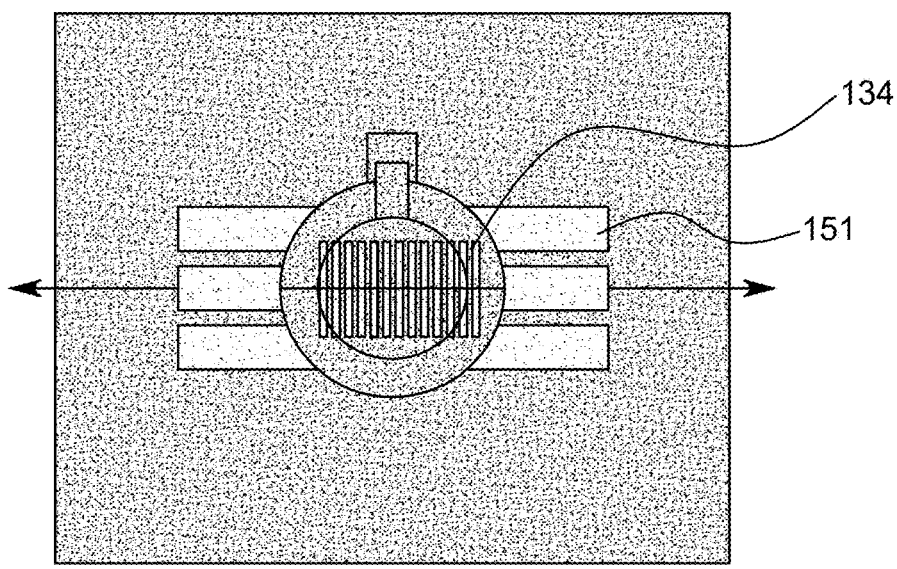

The regrowth interface is out of the optical/current paths. In one embodiment, the regrown layer, the new growing layers cause some defects on the crystal before arriving at the HCG layer. The structure includes the bottom DBR 116, active region (layer) 112, a thin sacrificial layer 114, a mesa 122 therebetween, and a regrowth sacrificial layer 114. In one embodiment, the mesa 122 grows laterally during regrowth for a slightly bigger than mesa 122 HCG, FIGS. 17A and 17B As a non-limiting example, a vertical step on the MEMS beams is not a problem. There is no need for implantation confinement.

Figure 18A:
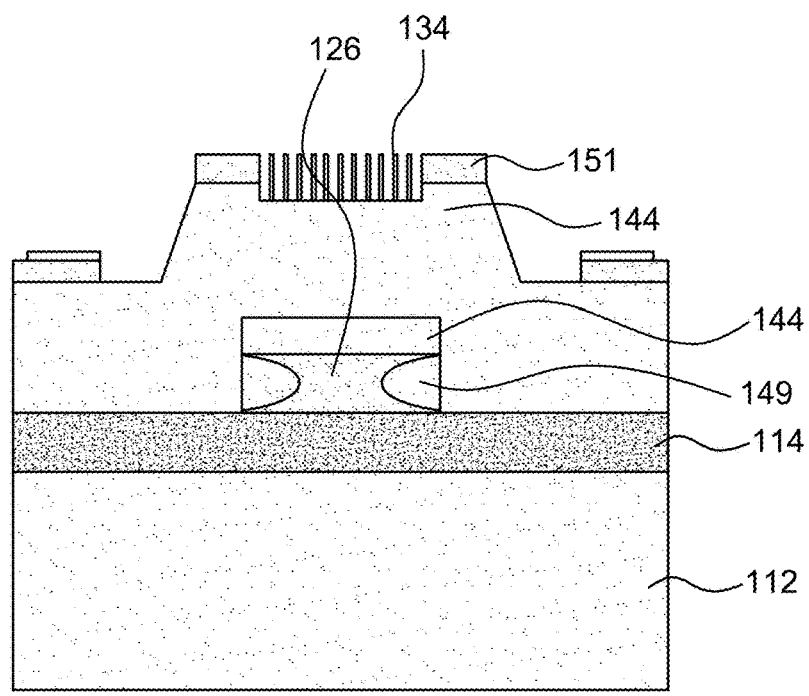
FIGS. 18A and 18B illustrate cross sections and top views of the MO-MEMs anchors, of the present invention.
Figure 18B:
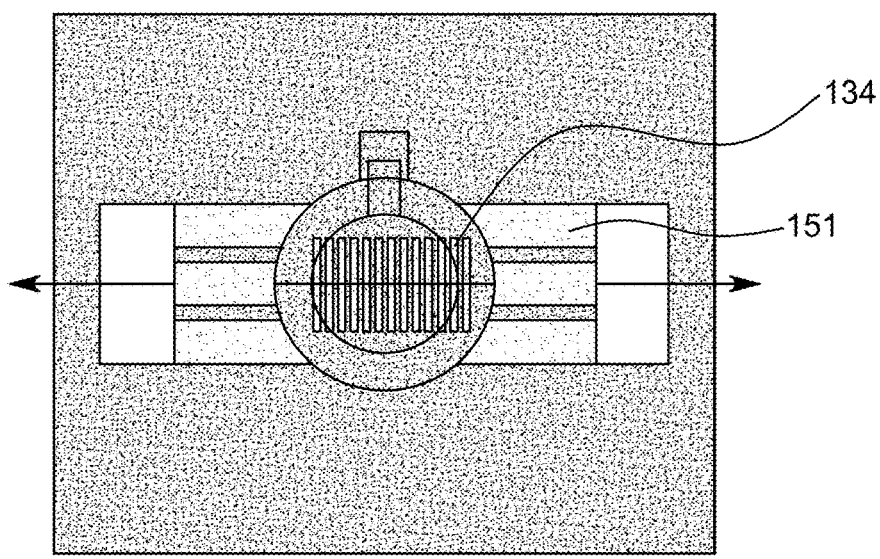
Figure 19A:
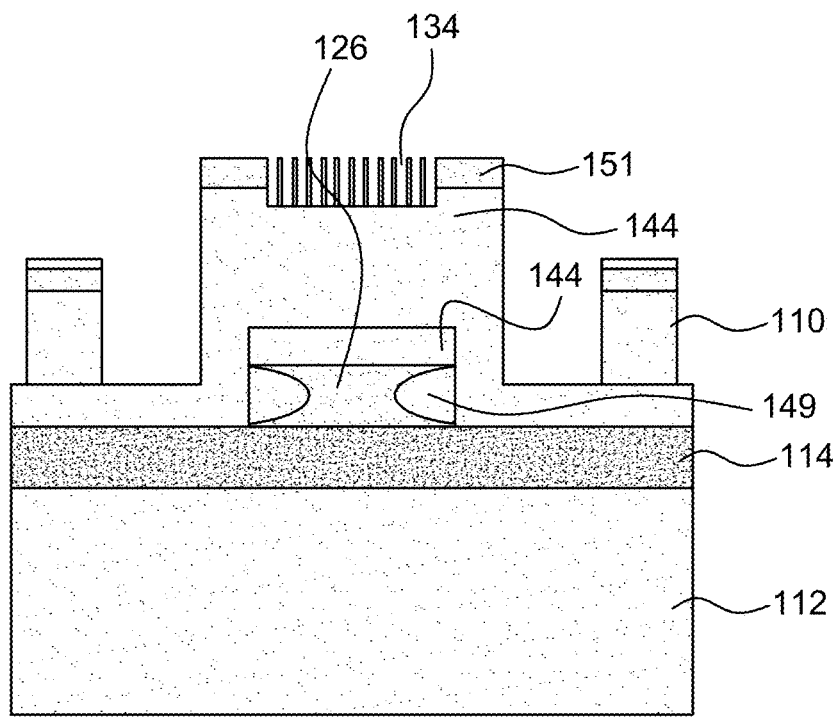
FIGS. 19A and 19B illustrate cross sections and top views of the second mesa etch, M1 access of the present invention.
Figure 19B:
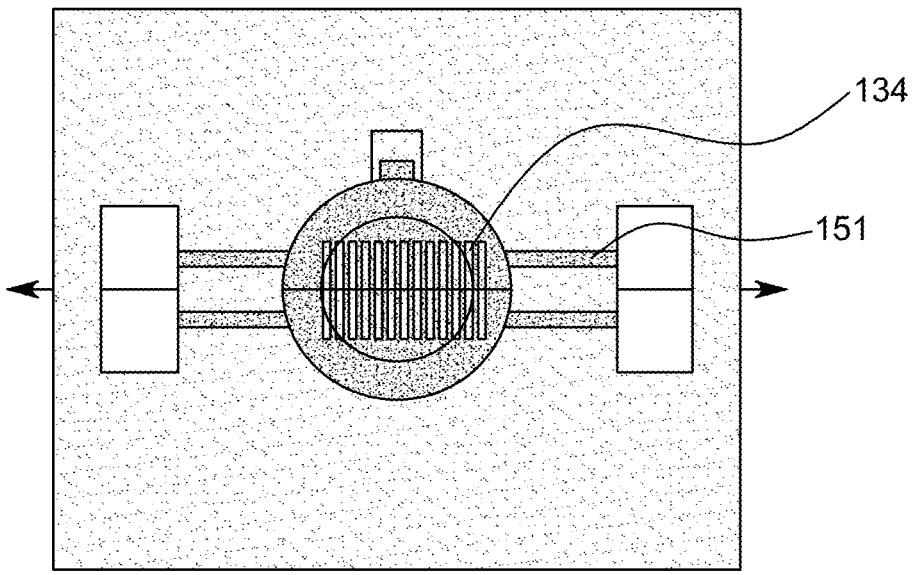
Figure 20A:
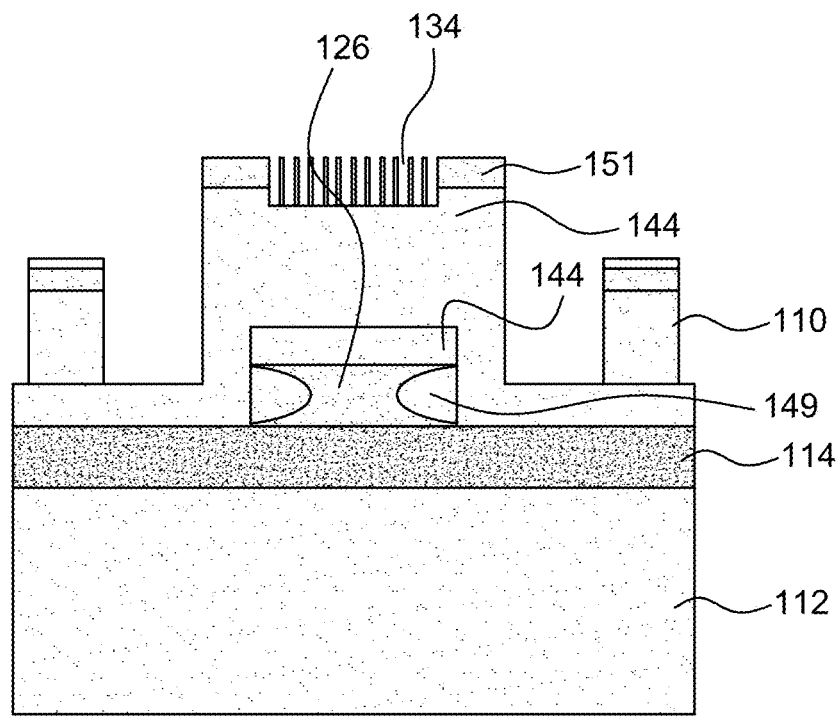
FIGS. 20A and 20B illustrate cross sections and top views of the second mesa etch, M1 deposit, of the present invention.
Figure 20B:
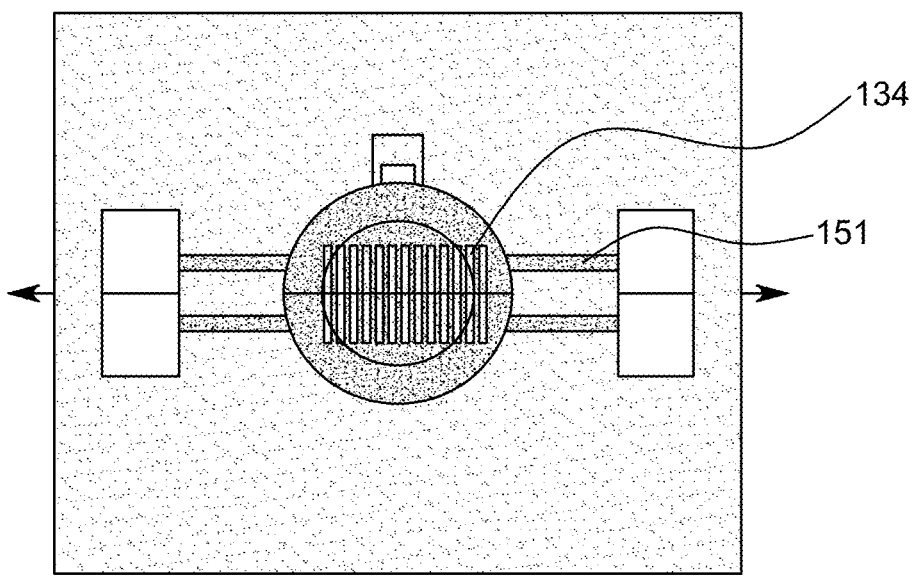

In one embodiment, mesa 122 confinement is provided, e.g., implantation is required only for contact isolation and current injection from the top of the mesa 122. In one embodiment, normal processing is completed for adding contact pads, which as a non-limiting example, the contact pads can be metal 3 and polyimide. MEMS anchors are on either side of the mesa 122, FIGS. 18A and 18B. In one embodiment, a second mesa etch is provides, FIGS. 19A and 19B, following by an MI cut, FIGS. 20A and 20B.

Figure 21A:
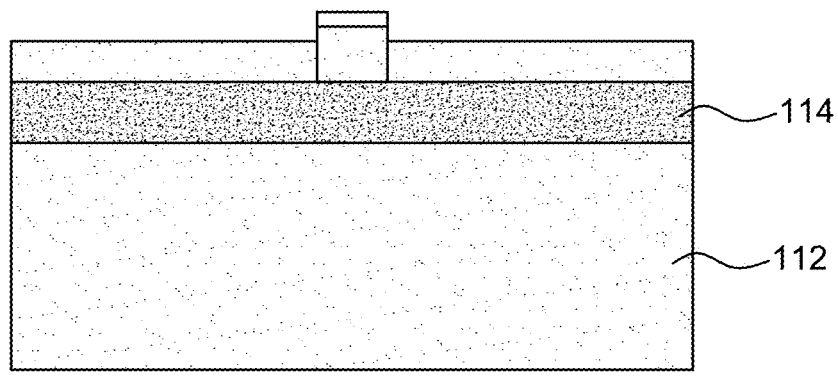
FIGS. 21A and 21B illustrate cross sections and top views of the M1 cut of the present invention.
Figure 21B:
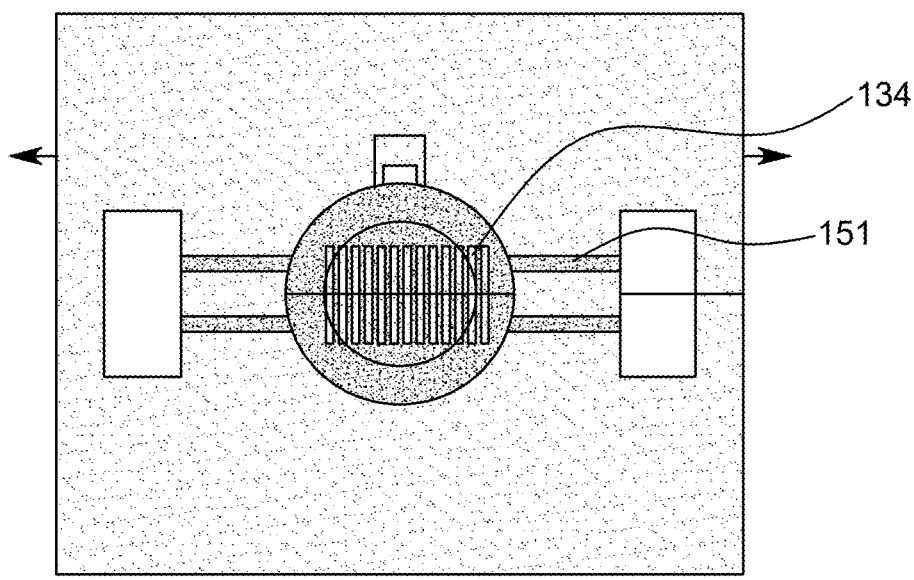
Figure 22A:
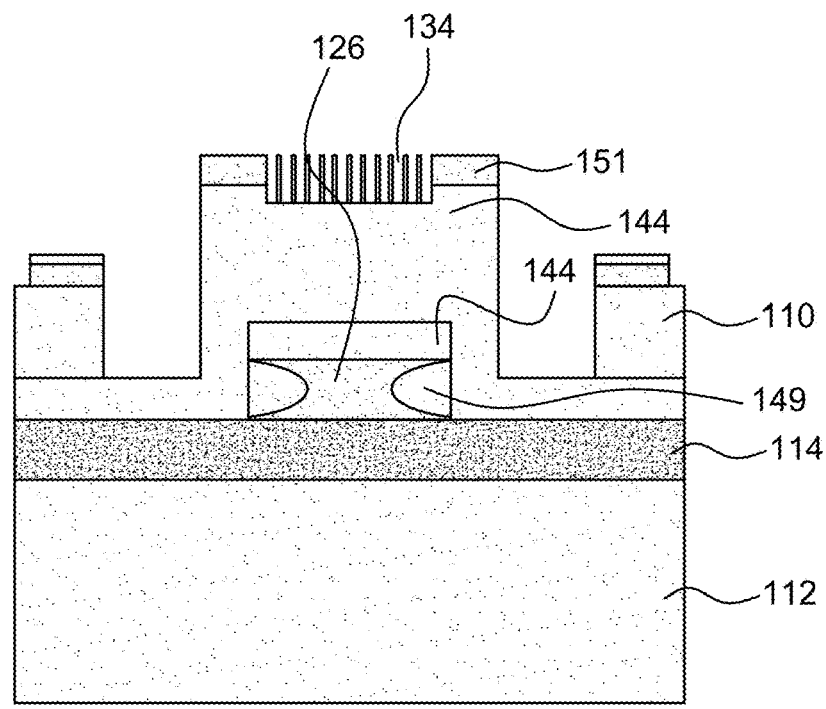
FIGS. 22A and 22B illustrate cross sections and top views of the M1 cut of the present invention.
Figure 22B:
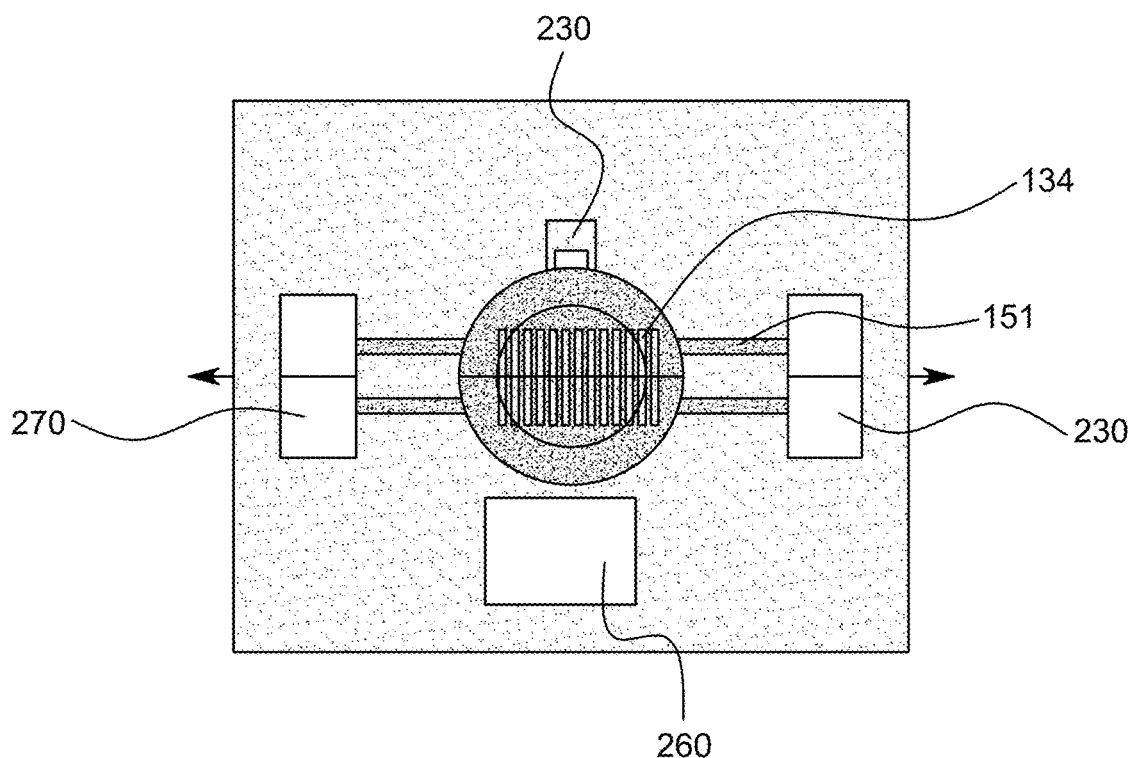
Figure 23:
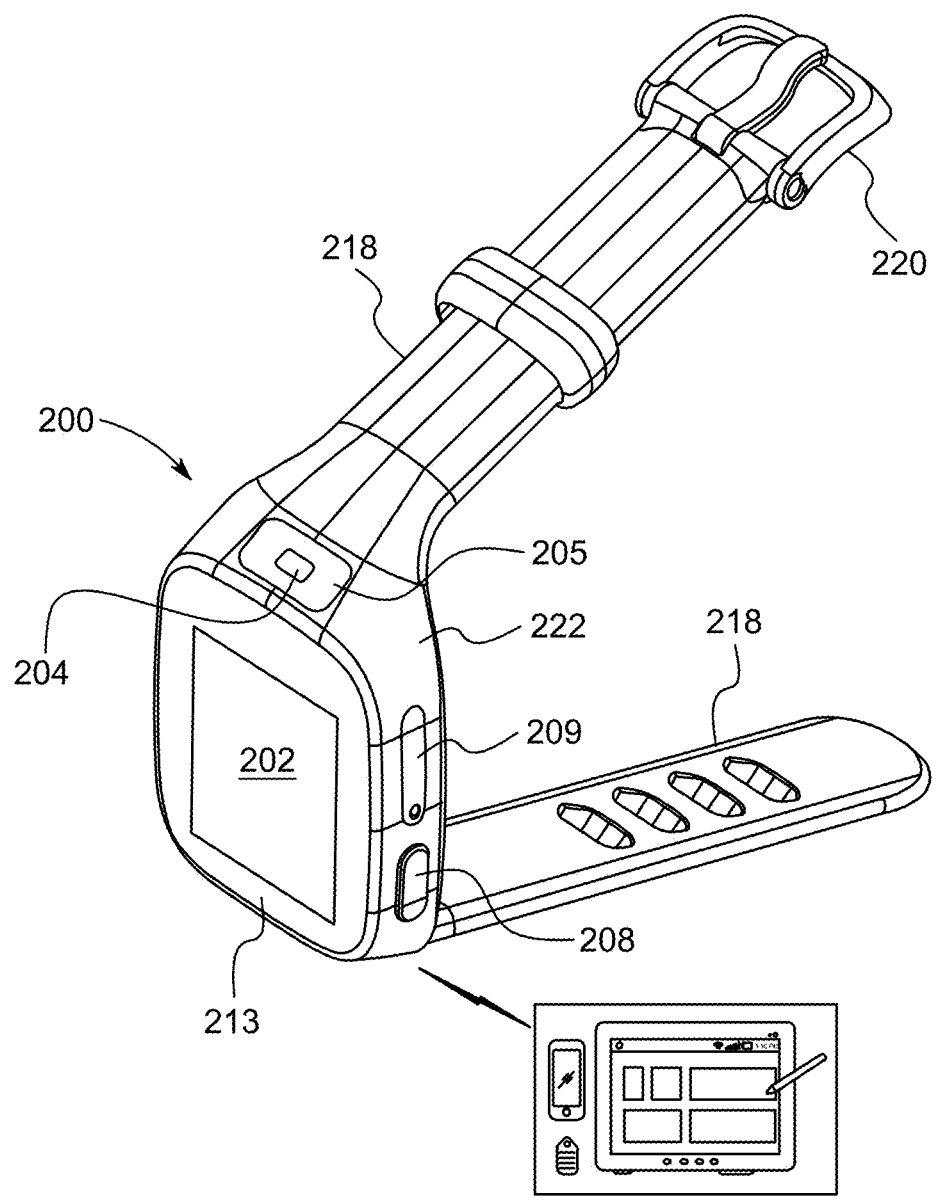
FIGS. 23-27 illustrate one embodiment of a smartwatch with one or more VCSEL's.
Figure 24:
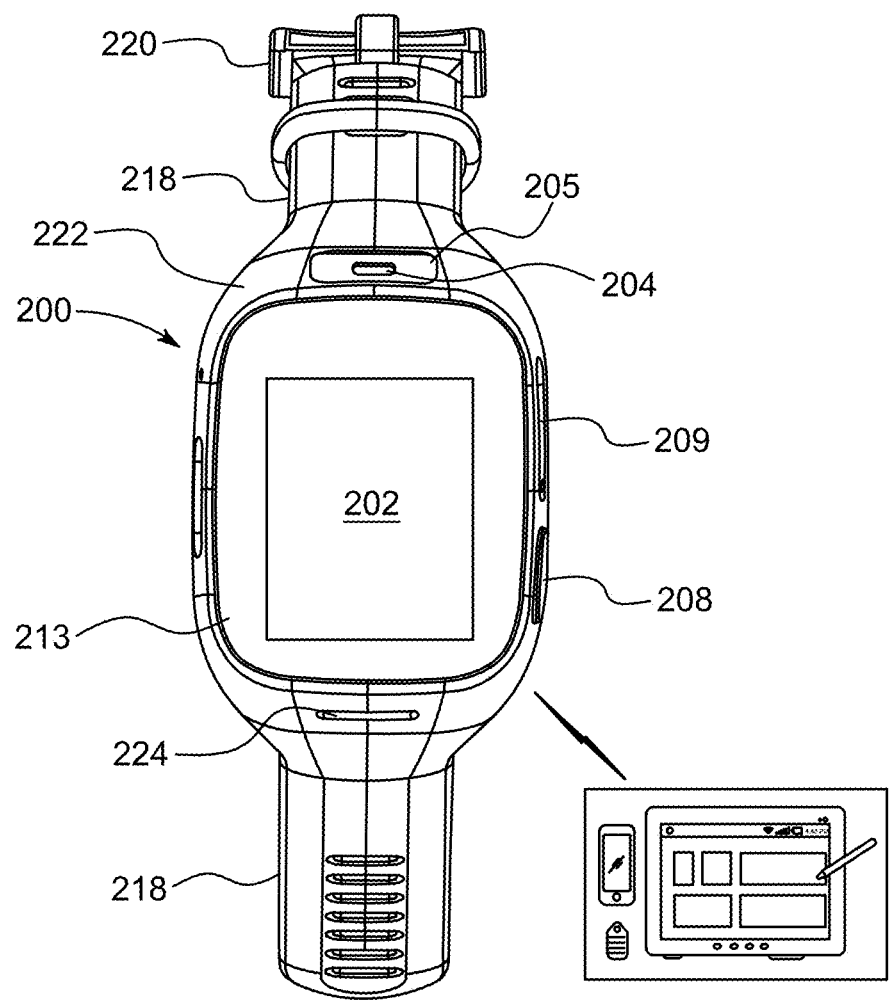

An opened access, M2, to the bottom DBR 116 contact is created, FIGS. 21A and 21B. This is followed by a release, FIGS. 22A and 22B. The release can be at the MEMS beams.

In one embodiment, the 38 of the VCSEL laser has a long wavelength, including but not limited to from 1 micron to 1.7 microns, and in one instance, 1.365 microns.

In one embodiment, VCSEL 10 products an output beam with a wavelength of 1550 nm is chosen due to its high signal-to-noise ratio (SNR) for glucose signals.

In one embodiment, the output 38 of the VCSEL laser is a long wavelength, at least partially created from indium phosphide structure or material in the VCSEL laser 10. As a non-limiting example, VCSEL laser 10 can include an indium phosphide substrate 46, or a substrate 46 that at least partially includes indium phosphide.

In one embodiment, VCSEL laser 10 is coupled to or includes atop DBR 42 or high contrast grating (HCG) 34. As a non-limiting example, bottom DBR 12 is a semiconductor DBR or a combination of a semiconductor DBR with a dielectric coating. In this manner, VCSEL 10 can include a dielectric coating. As a non-limiting example, the dielectric coating improves a broadening of a tuning range of the VCSEL laser 10.

In one embodiment, VCSEL laser 10 operates in a single mode or a multi-mode operation. As a non-limiting example, dimensions of the aperture and HCG 34 are contributing factors to the single mode operation.

In one embodiment, VCSEL laser 10 can deploy multiple tunnel junctions to enhance the output 38 of VCSEL laser 10.

As a non-limiting example, buried tunnel junctions (BTJ) improve an energy efficiency of VCSEL laser 10.

As a non-limiting example, a wavelength of the VCSEL laser output 38 can be swept to provide improved resolution. In one embodiment, the VCSEL laser output 38 is swept by modulating an HCG grating 34 up and down, e.g, its up and down movement relative to a top of VCSEL laser 10, wherein when the HCG 34 moves closes to non-extended portion relative to a top of VCSEL laser 10, a wavelength of the output 38 changes and returns closer to an original output 38 of the VCSEL laser, without extension of the grating.

In one embodiment, a mem's structure is coupled to the HCG grating 34 or top DBR 42 to create a swept source. As a non-limiting example, modulating a VCSEL laser output 38, in combination with a sweeping of wavelengths of the VCSEL laser output 38 allows for higher resolution and reduces at least a portion of atmospheric interference of VCSEL laser operation.

In one embodiment, multiple tunnel junctions increase an optical power of the VCSEL laser 19. These junctions are provided in a body of the VCSEL laser 10.

In one embodiment, a semiconductor optical amplifier is included with a modulator to allow a swept source to be modulated. As a non-limiting example, the modulation of the VCSEL laser turning the VCSEL laser on and off. As a non-limiting example, the modulation is from about 1 to 50 G. In another embodiment, the modulation is greater than 50 G.

As a non-limiting example, an optical photonic integrated circuit (PIC) is coupled to the VCSEL laser. The VCSEL laser can be mounted on the PIC. In one embodiment, a plurality of VCSEL lasers are mounted on the PIC.

In one embodiment, HCG 34 acts as a partial mirror. As a non-limiting example, HCG 34 can operate as a second mirror HCG 34 is positioned at the top of the vertical resonator cavity 32, following removal of at least a portion of the sacrificial layer 44. HCG 34 is positioned at the top of the vertical resonator cavity 32. As a non-limiting example, HCG 34 is positioned on a top of the mesa. in one embodiment, a plurality of support elements, anchors, hold HCG 34 in place. HCG 34 then moves, typically up and down relative to cavity 32.

Two or more support elements are provided. Support elements provide support for HCG 34. As a non-limiting example, support elements can have dimensions of 50 microns long, one micron wide. Their thickness is determined by a growth of HCG 34 layer. Superficial layer 44 is defined by epitaxial growth. As a non-limiting example, HCG deformation is provided under different points of operation. For broad tuning, HCG 34 deforms and moves away from cavity 32. A period and duty cycle of HCG 34 are determined by the amount of deformation. As a non-limiting example, a thickness of support elements define their function. A modification of support elements occurs when there is an actuation. This causes support elements to bend and HCG 34 deforms. In one embodiment, the support elements 45 are not straight beams. In various embodiments, there can be variations of support elements to modify HCG 34 deformation.

A good portion of sacrificial layer 44 is substantially removed, at least a portion creating anchors for HCG 34.

As a non-limiting example, a main actuation of HCG 34 can include but not be limited to: electrooptic, with an application of voltage across the surface of HCG 34, thermal, piezoelectric and the like. an air gap is between the top surface of vcsel laser 10 and HCG 34. Top DBR is not necessary.

When a voltage is applied, anchors do not allow current to flow over and cause HCG 34 to move. This creates charging between HCG 34 and the mesa 122. When voltage is increased, an attraction vis electro static actuation can be increased. As a non-limiting example, actuation is achieved with piezoelectric, thermal and the like. This provides tuning that depends of the wavelength and power. In one embodiment, tuning up to 100 nm is provided.

In one embodiment, electrostatic actuation is used by application of a voltage

As a non-limiting example, less than 1% of the output beam is emitted from vcsel laser 10.

The remaining portions of sacrificial layer 44 not removed provide anchoring points for HCG 34. As a non-limiting example, portions of the sacrificial layer 44 remain to provide anchoring in order for HCG 34 to move.

There can be two or more support elements coupled to a remaining portion of sacrificial layer 44. In one embodiment, four support elements are provided. Different directions of moving HCG 34 are provided. In various embodiments, HCG 34 can have a variety of different geometries, including but not limited to hexagonal, octagonal, a double frame design and the like.

In one embodiment, the output 38 of the VCSEL laser has a long wavelength, including but not limited to from 1 micron to 1.7 microns, and in one instance, 1.365 microns.

In one embodiment, the output 38 of the VCSEL laser is a long wavelength, at least partially created from indium phosphide structure or material in the VCSEL laser 10. As a non-limiting example, VCSEL laser 10 can include an indium phosphide substrate, or a substrate that at least partially includes indium phosphide.

In one embodiment, VCSEL laser 10 is coupled to or includes atop DBR 42 or high contrast grating (HCG) 34. As a non-limiting example, bottom DBR 12 is a semiconductor DBR or a combination of a semiconductor DBR with a dielectric coating. In this manner, VCSEL 10 can include a dielectric coating. As a non-limiting example, the dielectric coating improves a broadening of a tuning range of the VCSEL laser 10.

In one embodiment, VCSEL laser 10 operates in a single mode or a multi-mode operation. As a non-limiting example, dimensions of the aperture and HCG 34 are contributing factors to the single mode operation.

In one embodiment, VCSEL laser 10 can deploy multiple tunnel junctions to enhance the output 38 of VCSEL laser 10.

As a non-limiting example, buried tunnel junctions (BTJ) improve an energy efficiency of VCSEL laser 10.

As a non-limiting example, a wavelength of the VCSEL laser output 38 can be swept to provide improved resolution. In one embodiment, the VCSEL laser output 38 is swept by modulating an HCG grating 34 up and down, e.g, its up and down movement relative to a top of VCSEL laser 10, wherein when the HCG 34 moves closes to non-extended portion relative to a top of VCSEL laser 10, a wavelength of the output 38 changes and returns closer to an original output 38 of the VCSEL laser, without extension of the grating.

In one embodiment, a mem's structure is coupled to the HCG grating 34 or top DBR 42 to create a swept source. As a non-limiting example, modulating a VCSEL laser output 38, in combination with a sweeping of wavelengths of the VCSEL laser output 38 allows for higher resolution and reduces at least a portion of atmospheric interference of VCSEL laser operation.

In one embodiment, multiple tunnel junctions increase an optical power of the VCSEL laser 19. These junctions are provided in a body of the VCSEL laser 10.

In one embodiment, a semiconductor optical amplifier is included with a modulator to allow a swept source to be modulated. As a non-limiting example, the modulation of the VCSEL laser turning the VCSEL laser on and off. As a non-limiting example, the modulation is from about 1 to 50 G. In another embodiment, the modulation is greater than 50 G.

As a non-limiting example, the smartwatch of the present invention can include: a printed circuit board (PCB), one or more sensors, a screen/display, battery, wireless chip-set, processor and an attachment system such as a band.

In one embodiment, PCBs include electronic components such as sensors, wireless chipsets, processors are mounted and routed together to achieve functionality. A variety of PCBs can be used, including but not limited to: rigid, flexible, rigid-flex circuits, and printed electronics. The manufacturing process of the printed circuit board is energy-intensive and, hence, a significant contributor to climate change.

Sensors are provided to monitor the user's movements to give them a better understanding of their activity. Examples of sensors found in wearables include accelerometers, gyroscopes, altimeters, temperature sensors, bioimpedance sensors, and heart rate monitors. This diversity of sensor technology results in various material compositions, and some may contain hazardous substances that can potentially harm environmental and human health.

The screen/display can be an input and output element of wearable technology and i used for communication purposes. The display can be divided into two parts: an inductive touch panel and a smart display. Examples of screen types used in wearable technology are AMOLED, OLED, E-ink, traditional LCD, and sharp memory LCD. E-ink and LED are the most widely used technology, as they consume less power.

One or more batteries can be used as a main source of power. The type of battery can vary. In one embodiment, the battery is a lithium polymer and Li-ion.

A wireless chipset can provide data transmission through a wireless radio, including cellular/GSM, GPS, Wi-Fi, Bluetooth, and NFC. The small size of wearables requires manufacturers to opt for chipsets that incorporate these functions and, at the same time, can fit into a narrow frame. Additionally, the electricity consumption of this component is a key factor to consider as wearables need a chipset that can be activated all the time to continuously monitor sensors and collect data.

One or more processors can be provided. These can be used for running the smartwatch operating system, applications, receiving input from sensors or the user, and producing output. Advanced RISC Machines (ARM) processors can be used.

An attachment system connects the device to a user (e.g., a band, clip, adhesive, or necklace). The materials used vary with the type of attachment but generally include plastics, silicone rubber, fabric, leather, and/or metal.

FIGS. 23-27 illustrate one embodiment of a smartwatch 200 that can be used with one or more VCSEL's 10 to detect and/or monitor a user's health parameters, including but not limited to sleep apnea, respiratory issues, stress, pulse oximetry, brain waves, atrial fibrillation, glucose levels and the like. The smartwatch may include a display 202, an optical sensor 204, electrode 205, electrodes 206, VCSEL 100, button 208, SIM card slot 209, speaker 210, microphone 212, charging pins 214, heart rate sensor 216, a band 218, a latch 220, a housing 222, an external sensor 224, an artificial intelligence engine 400, coupled to one or more smartwatch 200 components.

In response to a glucose measurements, smartwatch 200, and particularly display 202, can display a user's glucose predictive information, relative to one or more components of smartwatch 200 to predict what will happen; or prescriptive, meaning the system will use the data to make suggestions about what action to take, This predictive information can be, based on the user's glucose information, make recommendation to the user about future ways to control the user's glucose, including but not limited to: real-time blood glucose information, manually log blood glucose, food, medication, and exercise. User's can also view various daily statistics and diabetes management goals they set.

The smartwatch 200 has a housing 222 configured to be positioned against the wearer's body and the band 218 configured to hold housing 222 against the wearer's body or skin. In one embodiment, housing 222 is a protective case, shell, or platform to which the remaining parts are directly or indirectly attached, integrated, or housed. A plastic or metallic housing structure is expected to be suitable for most embodiments. For example, housing 222 may be injection-molded plastic, cast magnesium, machined aluminum or steel, a polymer, or other strong materials. The housing 222 may be molded, 3D printed, machined, or otherwise generated.

The housing 222 may include seals and other waterproof components. The housing 222 provides a framework that encases and protects the components of the smartwatch 200. In one embodiment, the smartwatch 200 is waterproof or water resistant so that the wearer can wear the smartwatch 200 is any number of locations, circumstances or during activities where it is important to monitor the user.

In one embodiment, all, or portions of housing 222 may be removed to access, fix, replace, or update various portions of the smartwatch 200. For example, a back of housing 222 may include a removeable plate that may be attached utilizing miniatures bolts/screws that are sealed utilizing one or more seals. As a result, components, such as the battery, transceiver, buttons, logic, memory, display, or so forth may be replaced as needed.

The band 218 may attach to or extend from edges of housing utilizing one or more pins, rods, supports, or so forth. The band(s) 218 may include a support or structure that wraps entirely or partially around the user's body to hold smartwatch 200 in place. In the example shown, the band 218 is configured to hold housing 222 against the user's wrist, ankle, or shoulder. The band 218 may also be configured to hold housing against the head, upper arm, hand, finger, leg, neck, waist, chest, ankle, leg, or additional portion of the user's body. The band 218 may include one or more flexible or rigid straps. The band 218 may also utilize a spring-loaded or interference fit. One or more antennas of the smartwatch may extend partially or completely into the band 218. For example, one or more antennas may extend into a portion 219 of the band (see FIG. 3). For example, the portion 219 may extend from one or both sides of the band 218 for one or more of a cellular, Wi-Fi, Bluetooth, or other proprietary signals, protocols or standards utilized by the smartwatch 200.

In one embodiment, the band 218 may be secured, closed, bound, or joined joinable by a latch 220. The latch 220 may represent a buckle, magnets, buttons, or other securing and locking mechanism. The latch 220 may be self-closed or may be secured to the body or clothing of the user. In one embodiment, the latch 220 may lock the band 218 to the body so that it may be only removed utilizing a secured process (e.g., key, digital code, magnetic release, radio frequency tag, etc.). For example, the latch 220 may be utilized to secure the smartwatch 200 to a user with memory issues, a medical condition, a tendency to wander, an infant or child, or others that may need special care. As a result, the user may be more carefully monitored.

In one embodiment, the band 218 may include conductors or other sensors. If cut, broken, or removed without the latch 220 being properly opened, the smartwatch 200 may generate an alert. The smartwatch 200 may also send a running record of the status and location of the user in case the smartwatch 200 is removed, damaged, or purposely destroyed so that the data is kept in a database, cloud system, server, or other device. For example, the status of the user may be sent at a pre-defined interval, such as 30 seconds, 2 minute, 5 minutes, 10 minutes, 30 minutes, 1 hour, or other time period.

The band 218 may be movably or rigidly secured to housing 222 by pivot pins, a cantilevered anchor, and so on. The band 218 also may be composed or formed integrally with housing 222. The band 218 may also be removed for securing the body/housing 222 of the smartwatch 200 (without the band 218) within or to clothing, adhesives, third party straps, or so forth. For example, housing 222 may be directly adhered to the body of the user.

In one embodiment, when configured for use on the wrist, the smartwatch 200 may have the form factor of a traditional watch or fitness tracker. For example, the smartwatch 200 may be formed as a watch, band, or strap. The components of the smartwatch 200 may be integrated into all or portions of housing 222 and/or band 218. For example, the smartwatch 200 may not include a traditional larger display, but instead may have a smaller display or displays that fits into the narrower band 218. An interior portion of housing 222 may include any number of dividers, separators, walls, slots, mounts, or other components for manufacturing, replacing, or separating the components of the smartwatch 200.

In one embodiment, the band 218 may house flexible electronics. The flexible electronics and circuits may be mounted on a flexible plastic substrate, such as polyimide, PEEK, or transparent conductive polyester film. Various photolithographic techniques may be used to generate the various components and electronics as herein described. In one example, housing 222 may have a generally flat rectangular or rounded shape (e.g., rectangle, circle, ellipse, etc.) that extends in a plane with a maximum dimension in the plane of approximately two inches or less, and a thickness extending perpendicular to the plane of approximately one quarter inch or less. However, the dimensions of the smartwatch 200 may vary. The band 218 may be rotationally attached to edges of housing 222 and configured to encircle a volume having a diameter of about two to three inches (e.g., circumference of 6.5-9.5 inches), or such a size as corresponds to the typical dimensions of a human wrist. The housing 222 optionally may be provided with conventional wristwatch features, such as a bezel, face, and mechanical movement or digital clock for telling time.

The smartwatch 200 includes one or more VCSEL's 10, with 10. VCSEL 10 can be coupled to or includes include one or more sensors configured to collect vital biometric information from the user, environmental information, and so on. For example, the sensor array, VCSEL 10 may represent an optical sensor 211. The optical sensor 211 may be utilized as a heart rate sensor that measures the heart rate of the user and the changes or variability of the user's heart rate. One or more portions of the sensor array 10 may be located at an inner surface 203 of housing 222 (i.e., the surface facing the user's body during use). For example, the sensor array 10 may include one or more optical sensors 211 located approximately centrally on the inner surface 203 of housing 222, and oriented to direct one or more spectra of light from the inner surface 203 towards the user's body. The optical sensors 211 (or other sensors of the sensor array 20) may include one or more emitters and receivers. Other components, such as antennas, waveguides, amplifiers, pulse generators, may also be utilized by the sensor array 10. The optical sensors 211 may direct the light, wireless signals, or other emissions at a 90° angle to the inner surface 203, or at an angle less than or greater than 90°. Any desired patterns, numbers, angles, emitters/receivers, settings, and configuration of optical sensors 211 and associated light sources may be used. Light emitting diodes (LEDs) may be utilized as optical transceivers for the optical sensors 211, but other light sources or emitters may be used in other embodiments. For example, one or more laser sensors may be utilized. The optical sensors 211 may also be referred to as optical transceivers, emitters, and receivers.

VCSEL 10 may include any number pressure, motion, optical, mechano-acoustic, phonocardiograph (PCG), and photoplethysmography sensors. In another embodiment, the inner surface 203 may include one or more radar detectors for detecting blood flow and variability to detect the heart rate of the user. For example, the smartwatch 200 may measure the heart rate of the user using ultra-wideband (UWB) impulse radar. UWB impulse radar may utilize low amounts of power and is harmless to the human body as utilized by the smartwatch 200.

The optical sensors 211 may emit light or wireless signals at one or more wavelengths or spectrum. For example, a first group/components set of one or more of the optical sensors 211 may emit light primarily at about 350-450 nanometers (green light), a second group of one of more of the optical sensors 211 may emit light primarily at about 605-750 nanometers (red light), and a third group of the one or more optical sensors 211 may emit light primarily at about 850-1020 nanometers (infrared light). The wavelengths or signals of each group may be clustered together or distributed among the other groups. The different groups of wavelengths and/or signals may be operated simultaneously or separately, as desired. For example, electromagnetic phase-shift spectroscopy may be utilized as is known in the art. Low-energy electromagnetic waves may be broadcast utilizing any number of transmitters/emitters, transmitters, receivers, transceivers, antennas, and so forth. In one example, the red light and infrared light groups may be alternatively activated to operate in a manner to cause oxyhemoglobin and deoxyhemoglobin in the blood to absorb the different light energies for measurements, and these energy levels may be compared to determine blood oxygen saturation, using techniques known in the art.

In one embodiment, optical sensors 211 are positioned and oriented to both emit and receive back signals reflected from the user's body. The optical sensors 211 may measure light reflected from the user's body to detect the presence, amplitude, phase, attenuation/impedance, and other characteristics of reflected light. Optical sensors, photodiodes, or other light receivers which produce a voltage, current, or signal proportional to the amount of impinging light energy may be utilized. The one or more emitters and receivers of the optical sensors 211 may be positioned in any number of patterns.

The receivers of the optical sensors 211 may be tuned to detect and measure particular wavelengths of light. For example, a first group of optical receivers may have a band-pass filter that only transmits/receives light at a range of about 350-450 nanometers (green light), a second group of optical receivers may have a band-pass filter that only transmits/receives light at a range of about 605-750 nanometers (red light), and a third group of optical receivers may have a band-pass filter that only transmits/receives light at a range of about 850-1020 nanometers (infrared light). As another example, one or more of the receivers may include a multi-band "knife-edge" or narrow band filter that allows light at multiple discrete wavelengths to pass through (e.g., a filter that transmits light at one or more wavelengths within the range of 605-750 nanometers and one or more wavelengths within the range of 850-1020 nanometers). As still another example, the received or reflected signals may be unfiltered.

VCSEL 10 may be located at any suitable location on the smartwatch 200 including housing 222 or the band 218. A location at a geometric middle of the VCSEL 10 may provide improved shielding against ambient light, but this is not required as other locations may be utilized. VCSEL 10 also may be located on a protuberance or extensions that extends away from housing 222 relative to the adjacent portions of the inner surface 203, which may make it more likely that the sensor array 10 will rest firmly against the skin. Such a protuberance or extension may act like a fulcrum that remains in contact with the skin as housing 222 rocks through a range of motion on the user's body. VCSEL 10 may also sit flush with housing 222 on the inner surface 203. In another embodiment, the sensor array 10 may reside within a receptacle, cavity, or hole within housing 222 to provide additional protection, enhanced angles for applications of light/signals, or to better eliminate contamination from ambient light.

In one embodiment, the inner surface 203 includes contacts for detecting contact of smartwatch with the wrist, arm, body, or skin of the user. The contacts may be utilized with other sensors to determine user biometrics, determine the status of smartwatch 200 (e.g., worn, not worn, charging, etc.) relative to the user, and provide environmental information.

The housing 222 may include any number of sidewalls, interior surfaces, exterior surfaces, and structures. The housing 222 may include a unibody structure or joined materials. The housing 222 may also include trim, inserts, separators, dividers, or other components that structurally and functionally enable the different components. For example, the different components may include contacts, buttons, switches, touch interfaces, and so forth.

Smartwatch 200 may include one or more user interfaces, such as displays, user inputs, audio speakers, microphones, haptic feedback devices (e.g., vibrators or tactile probes), projectors, and so on. The housing 222 (or band) may define any number of holes, ports, or outlets for the microphone 212 and speakers 210 to both receive and communicate sound waves. In one example, the outer surface 213 may have a display 202 configured to provide information to the user/user or a person assisting the user. An exemplary display 202 may include one or more lights, indicators, or displays, such as light emitting diodes (LED), a two-dimensional LED screen, a two-dimensional liquid crystal display (LCD), a touch screen, and soon. The display 202 may be a touch display for providing information and receiving input from the user. For example, the display 202 may be configured to display specific information, such as time of day, biometrics, location information, health/medication reminders, self-care reminders, appointments, and so forth. The display 202 may work in conjunction with the speaker 210, vibrator, lights, contacts, or other user interface components. The display 202 may also include any number of touch-based, optical, or proximity sensors for detecting information from the user and/or environment.

An exemplary input may include a button, such as a capacitive button, a mechanical button, a momentary switch, or the like. The smartwatch 200 may also include dials, switches scroll wheels, or other mechanical components as well as soft buttons configured to be presented by the display 216 for selection based on the mode, activity, configuration, or user preferences implemented by smartwatch 200. Multiple displays 216 and multiple buttons may also be used. Functions of the displays 216 and inputs 218 are described in more detail below.

The smartwatch 200 includes charging pins 214. The charging pins 214 may be utilized to charge smartwatch 200 and may also include or incorporate one or more charging ports, communication ports, or the like. The charging pins 214 may be configured to receive a charger that may be utilized while smartwatch 200 is being worn by the user or when removed. The charging pins 214 may be recessed within the side of housing 222 to protect the charging pins 214 while smartwatch 200 is being worn. For example, the charging pins 214 may include three, four, or more pins for charging smartwatch 200 and performing communications or updates as needed. The charging pins 214 may also include a removable rubber, silicon, plastic, or polymer cover (not shown) to further protect the charging pins 214 from being bent, or subjected to water, dust, exposure, excessive wear, or so forth. The cover may include a tether or attachment point for the cover. The wearable charger may be included with smartwatch 200 as an accessory. The charging pins 214 may be associated with magnets that may be utilized to connect a charging adapter that may interface with the charging pins 214 to recharge the battery of smartwatch 200.

The charging pins 214 may also be utilized to perform data communications, including updates, synchronization, downloads, or other communications between smartwatch 200 and another device. For example, a charging adapter may include a connector for interface with the charging pins 214 on a first end and a USB connector on another end for connection to a computer, tablet, power adapter/wall outlet, or other power source. The housing 222 also may include one or more charger mounts or interfaces that are configured to mate with a portable charging device, as discussed in more detail below.

In another example, a mini-USB (universal serial bus), micro-USB, standardized port, or custom port may be provided on housing 222 or other portion of the outer surface 213 to selectively connect to a charging and/or communication cable. As another example, a dedicated charging port (not shown) may be provided on housing 222, sensor array 10, band 218, or the outer surface 213. In another embodiment, smartwatch 200 may also utilize inductive chargers that utilized one or more magnets or interfaces integrated with the charging pins 214 to properly align smartwatch 200 with a charging device, cable, cord, or so forth.

The speaker 210 may communicate the generated sounds through one or more ports or openings in housing 222. Although not shown, the speaker 210 may include components such as digital-to-analog converters, amplifiers, attenuators, filters, and/or other components necessary for the speaker 210 to convert an electrical signal into a sound wave. In one embodiment, the speaker 210 may include multiple speakers including a tweeter, a mid-range, and a bass speaker or associated component. In another embodiment, the speaker 210 may be configured to generate vibration signals or patterns communicated through the user's ear/head or bone structure. The speaker 210 may communicate measurement information, status of the user, operating mode or status of smartwatch, performance information (e.g., user, smartwatch, etc.), environmental information, or other applicable information.

The microphone 212 is a component for converting soundwaves into an electrical signal which may be amplified, recorded/saved, or communicated. The microphone 212 may receive voice commands from the user or other authorized parties or receive ambient sounds. The measurements performed by the microphone 212 may be utilized in real-time or saved for subsequent analysis, processing, or communications. For example, sounds may be stored in a memory (not shown) to be processed by one or more processors of smartwatch 200 to determine the ambient noise, location, individuals/animals near the user, and other applicable information. The microphone 212 may include components, such as analog-to-digital converters, amplifiers, attenuators, filters, and/or other components necessary for the microphone 212 to convert a sound wave into an electrical signal. Voice commands received by the microphone 212 may be used by one or more programs or applications executed by the processor for controlling one or more functions of smartwatch 200. In one embodiment, sounds, speech, and noises detected by the microphone 212 may be utilized to automatically adjust or tune the mode, settings, configuration, sensors, or other components and functions of smartwatch 200. For example, the user may be more closely monitored in audio conditions known to cause stress to the user (e.g., large groups, traffic, etc.).

As noted, ambient sounds received by microphone 212 may be used by the processor 24 for calibrating or modifying components and functions of smartwatch 200. For example, the processor may execute an application stored on the memory 20 adjusting the volume of alerts played by the speaker 210 in loud environments, such as "your heart rate is elevated, please sit down in a quiet area for five minutes."

It will be appreciated that the various components described as being part of housing 222 may alternatively be moved to the band 218, or the band 218 and housing 222 may be integrated into a single continuous structure. The components and features of smartwatch 200 may also be integrated into a band only form factor with integrated smaller displays and so forth.

The smartwatch 200 may include any number of transceivers for communicating with wireless devices 296. The wireless devices 296 may represent any number of smart/cell phones, tablets, computers, beacons, identification tags, network devices, servers, routers, hubs, or so forth. The wireless devices 296 may receive communications from smartwatch 200 at least in part wirelessly. Any number of wireless signals may be utilized, such as Wi-Fi, Bluetooth, cellular signals, Zigbee, and myriad other signals, protocols, standards, and/or variations. Wireless signals may be combined with any number of hardwired networks, signals, and protocols. The wireless devices 296 may also include servers. The smartwatch 200 may operate with one or more servers to form a system for monitoring the user as herein described.

Figure 28:
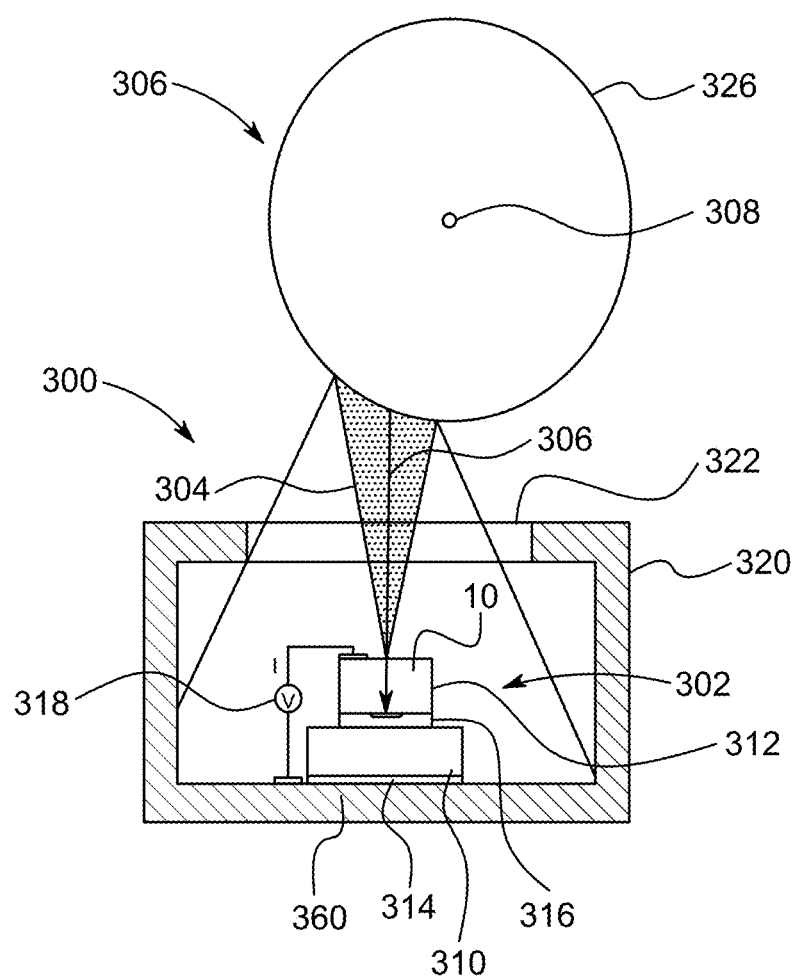
FIG. 28 illustrates one embodiment of a smartwatch with a VCSEL sensor system.

FIG. 28 illustrates shows a first embodiment of a sensor system. The sensor system 300 may include VCSEL 10 that can be the electromagnetic radiation source 302 positioned to light) toward the circumference of the shaft. As a non-limiting example, as recited above, VCSEL can produce a beam of electromagnetic radiation 304, with a long wavelength, including but not limited to from 1 micron to 1.7 microns, and in one instance, 1.365 microns In one embodiment, VCSEL 10 products an output beam with a wavelength of 1550 nm is chosen due to its high signal-to-noise ratio (SNR) for glucose. In one embodiment, signals from beam of electromagnetic radiation 304 may depend on a coherent mixing of electromagnetic radiation within a resonant cavity of VCSEL 10. The coherent mixing of electromagnetic radiation may include a mixing of a first amount of electromagnetic radiation generated by VCSEL 10, and a second amount of electromagnetic radiation redirected (e.g., reflected or scattered) from VCSEL 10 into a resonant cavity of VCSEL 10. The axis 306 of the beam of electromagnetic radiation 304 may intersect the circumference of the shaft, but may not intersect the longitudinal axis 308 of the shaft. In some embodiments, the axis 306 of the beam of electromagnetic radiation 304 may be neither perpendicular nor parallel to tangents of the circumference of the shaft (e.g., the axis 306 may intersect the shaft at an acute angle).

VCSEL 10 may include a first (or bottom) mirror 310 and a second (or top) mirror 312 stacked on (e.g., formed on) a semiconductor substrate 314. The first and second mirrors 310, 312 may have reflective surfaces that face one another to form a resonant cavity 316 therebetween. The second mirror 312 may be partially transmissive, and may 1) allow a portion of the electromagnetic radiation generated by the electromagnetic radiation source to escape VCSEL 10 allow a portion of the electromagnetic radiation redirected (e.g., reflected or scattered) from the circumference of the shaft to re-enter the resonant cavity of VCSEL 10. In some embodiments, the second mirror's transmissivity to the wavelength of electromagnetic radiation generated/received by VCSEL 10 may be about 1%, although higher or lower transmissivities may be used. The first mirror 310 may also be partially transmissive to the wavelength of electromagnetic radiation generated/received by the electromagnetic radiation source 402, but in some embodiments may be less transmissive than the second mirror 312.

By way of example VCSEL 10 can be a top-emitting configuration. In other embodiments, VCSEL 20 has a bottom-emitting configuration. In a bottom-emitting configuration, VCSEL 10 may have optical elements etched to its bottom substrate to change the light emitted by the VCSEL 10. In some cases, the optical elements may be used to adjust the divergence of light emitted by the VCSEL 10.

The resonant cavity 316 may be electrically or optically pumped to generate electromagnetic radiation (e.g., light), and a gain material within the resonant cavity 316 may amplify the electromagnetic radiation that reflects within the resonant cavity 316 (e.g., the gain material may receive x photons and emit y photons, with y≥x). When pumped to generate electromagnetic radiation, a current (I) may flow through the electromagnetic radiation source 302. The portion of the emitted electromagnetic radiation that is redirected from VCSEL 10 and that re-enters VCSEL 10, is coherent with the electromagnetic radiation that is generated by VCSEL 10, and interacts (mixes) with the generated electromagnetic radiation coherently. However, the electromagnetic radiation that re-enters VCSEL 10 may have a phase delay with respect to the VCSEL 10. The coherent mixing of generated and redirected electromagnetic radiation within the resonant cavity therefore produces an interference signal that modulates the beam of electromagnetic radiation 304 emitted by VCSEL 10. For example, if the nominal power of the beam of electromagnetic radiation 304 is one Watt (1 W), the actual power of the beam of electromagnetic radiation 304 may vary between 0.999 W and 1.001 W due to the coherent mixing of generated and redirected electromagnetic radiation within VCSEL 10.

This change in power happens as the threshold power of VCSEL 10 is modulated. For the same reason, the junction voltage of VCSEL 10 hanges when it is driven with a constant bias current, or the current passing through VCSEL 10 changes when VCSEL 10 is driven with a constant voltage.

The interference signal created by the coherent mixing of generated and redirected light may be measured by a sensor, such as an electrical sensor or an optoelectronic sensor.

As an example, FIG. 28 illustrates an electrical sensor (e.g., a voltage sensor 318) coupled to the VCSEL 10 to monitor a junction voltage (V) of VCSEL 10. Measurement of the junction voltage provides an indirect measurement of the power of the beam of electromagnetic radiation 304, because the junction voltage modulates in response to the coherent mixing of electromagnetic radiation within VCSEL 10.

In some embodiments, the sensor system 300 may be mounted within a module 320 having an open or covered aperture 322.

In one embodiment, smartwatch 200 uses artificial intelligence (AI), to assist viewers modify and create video streams. Employees and contractors with digital video system can also user the A. As a non-limiting example, the AI creates background animated images & sound to extend a viewer's or user experience using the device, and/or provide analysis of user content consumption to recommend other content among the available content library In one embodiment, all components of smartwatch 200 can have access and use the A. Examples of AI used include but are not limited to including linear regression, logistic regression, decision tree, SVM algorithm, Naive Bayes algorithm, KNN algorithm, K-means, random forest algorithm, dimensionality reduction, and the like.

As a non-limiting example, a k-means algorithm is used.

Figure 25:
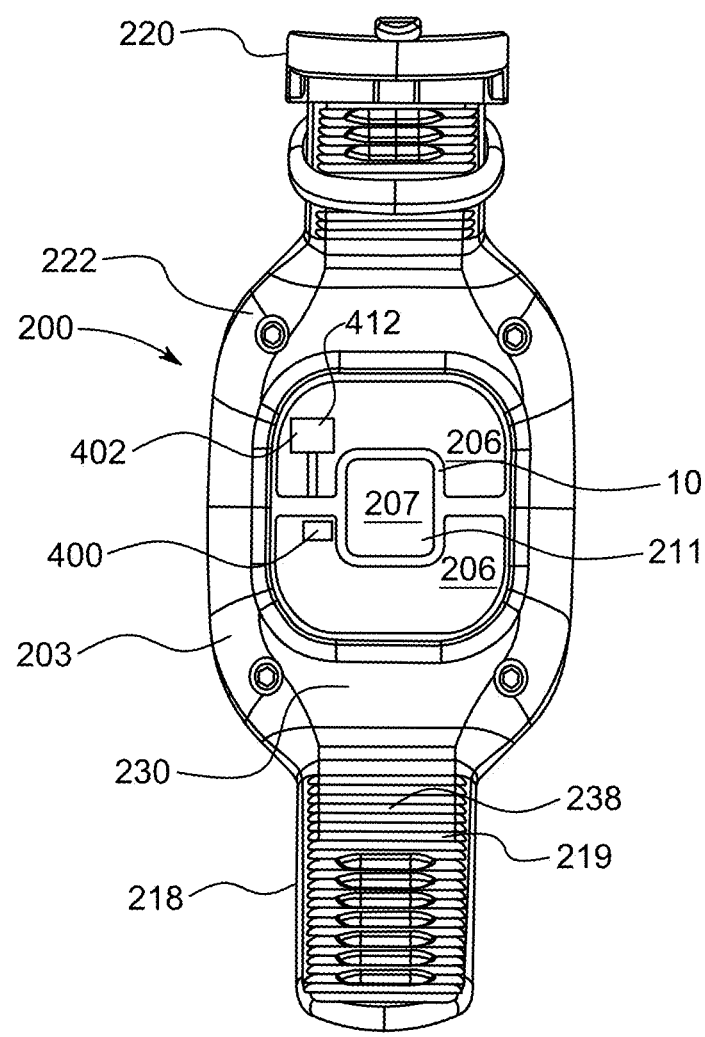
Figure 26:
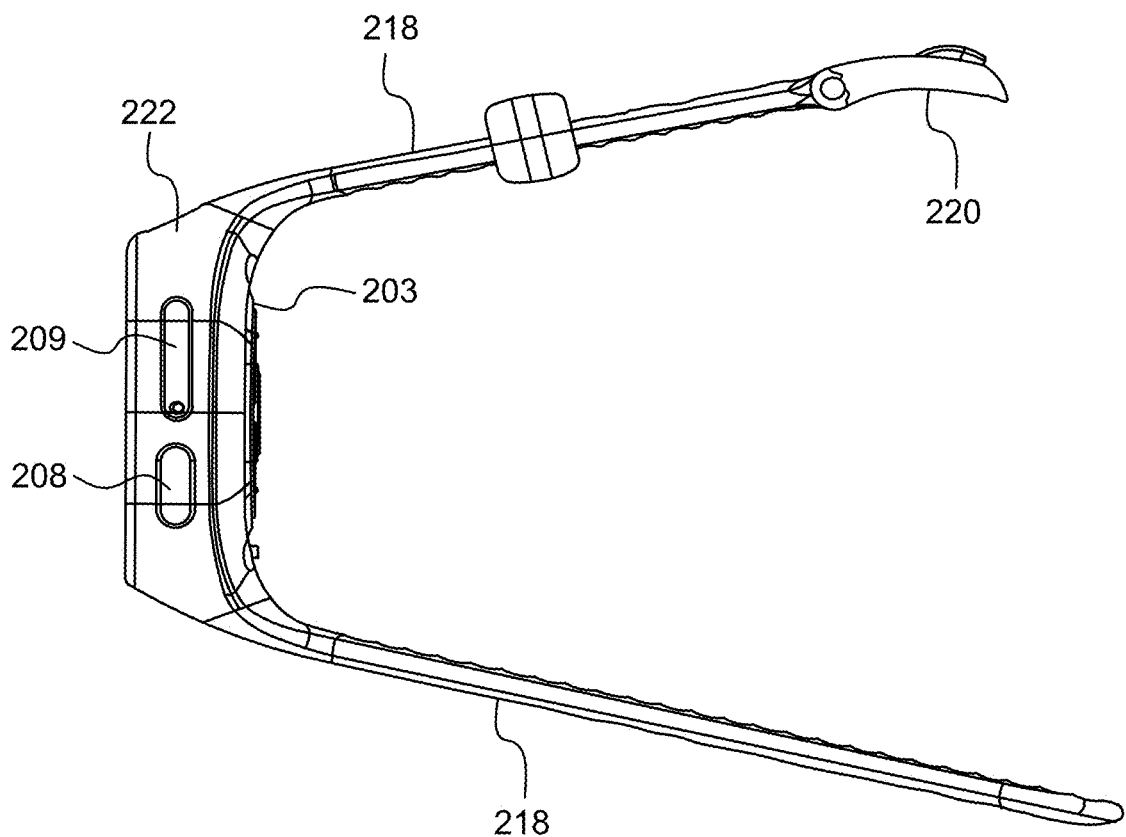
Figure 27:
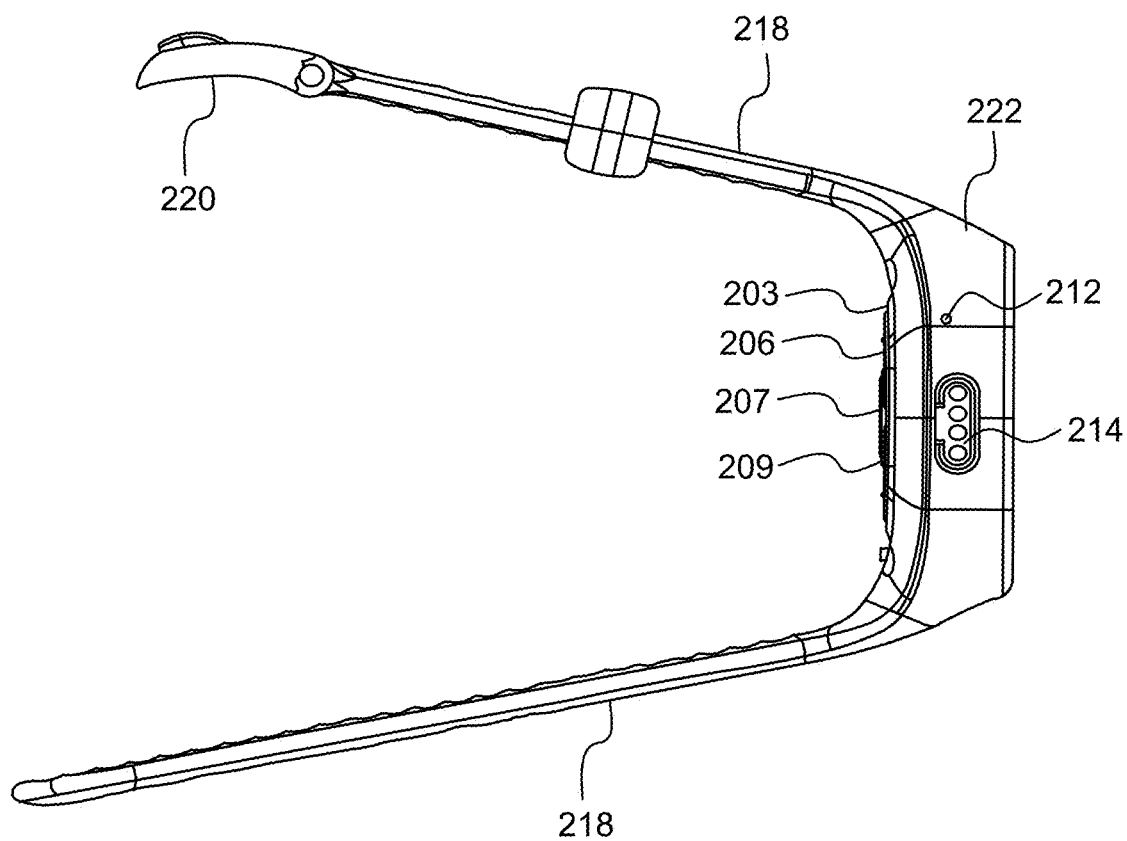

Referring to FIG. 25, in one embodiment, a user can seek from system a recommendation from the server and/or a recommendation engine 400. In one embodiment, the recommendation engine 400 make one or more of the following recommendations: offer access to medical specialists; improve communication and coordination of care among health care team members and a person getting care; offer advice for self-management of health care; uploading data to a wearer's health care team, including recommendations regarding exercise, types of food, when to eat when to exercise, blood sugar levels, how to modify blood glucose levels, and the like. These recommendation can be displayed at display 302.

The recommendation engine 400 contains identifications and profiles of users who have posted recommendations/ratings, as well as profiles for users and usage feedback for videos and streamed media. A user seeking to use the recommendation engine 400 is presented (at some time) with a set of questions or the system otherwise obtains data inputs defining the characteristics of the user. In this case, the user characteristics generally define the context which is used to interpret or modify the basic goal of the user, and therefore the reference-user(s) for the user, though the user may also define or modify the context at the time of use. Various considerations are used in a cluster analysis, in which recommendations relevant to the contexts may be presented, with a ranking according to the distance function from the "cluster definition". As discussed above, once the clustering is determined, advertisements may be selected as appropriate for the cluster, to provide a subsidy for operation of the system, and also to provide relevant information for the user about available products.

Clustering algorithms partition data into a certain number of clusters (groups, subsets, or categories). Important considerations include feature selection or extraction (choosing distinguishing or important features, and only such features); Clustering algorithm design or selection (accuracy and precision with respect to the intended use of the classification result; feasibility and computational cost; etc.); and to the extent different from the clustering criterion, optimization algorithm design or selection.

Finding nearest neighbors can require computing the pairwise distance between all points. However, clusters and their cluster prototypes might be found more efficiently. Assuming that the clustering distance metric reasonably includes close points, and excludes far points, then the neighbor analysis may be limited to members of nearby clusters, thus reducing the complexity of the computation.

There are generally three types of clustering structures, known as partitional clustering, hierarchical clustering, and individual clusters. The most commonly discussed distinction among different types of clustering's is whether the set of clusters is nested or unnested, or in more traditional terminology, hierarchical or partitional. A partitional clustering is simply a division of the set of data objects into non-overlapping subsets (clusters) such that each data object is in exactly one subset. If the clusters have sub-clusters, then we obtain a hierarchical clustering, which is a set of nested clusters that are organized as a tree. Each node (cluster) in the tree (except for the leaf nodes) is the union of its children (sub-clusters), and the root of the tree is the cluster containing all the objects. Often, but not always, the leaves of the tree are singleton clusters of individual data objects. A hierarchical clustering can be viewed as a sequence of partitional clustering's and a partitional clustering can be obtained by taking any member of that sequence; i.e., by cutting the hierarchical tree at a particular level.

There are many situations in which a point could reasonably be placed in more than one cluster, and these situations are better addressed by non-exclusive clustering. In the most general sense, an overlapping or non-exclusive clustering is used to reflect the fact that an object can simultaneously belong to more than one group (class). A non-exclusive clustering is also often used when, for example, an object is "between" two or more clusters and could reasonably be assigned to any of these clusters. In a fuzzy clustering, every object belongs to every cluster with a membership weight. In other words, clusters are treated as fuzzy sets. Similarly, probabilistic clustering techniques compute the probability with which each point belongs to each cluster.

In many cases, a fuzzy or probabilistic clustering is converted to an exclusive clustering by assigning each object to the cluster in which its membership weight or probability is highest. Thus, the inter-cluster and intra-cluster distance function is symmetric. However, it is also possible to apply a different function to uniquely assign objects to a particular cluster.

A well-separated cluster is a set of objects in which each object is closer (or more similar) to every other object in the cluster than to any object not in the cluster. Sometimes a threshold is used to specify that all the objects in a cluster must be sufficiently close (or similar) to one another. The distance between any two points in different groups is larger than the distance between any two points within a group. Well-separated clusters do not need to be spherical, but can have any shape.

If the data is represented as a graph, where the nodes are objects and the links represent connections among objects, then a cluster can be defined as a connected component; i.e., a group of objects that are significantly connected to one another, but that have less connected to objects outside the group. This implies that each object in a contiguity-based cluster is closer to some other object in the cluster than to any point in a different cluster.

A density-based cluster is a dense region of objects that is surrounded by a region of low density. A density-based definition of a cluster is often employed when the clusters are irregular or intertwined, and when noise and outliers are present. DBSCAN is a density-based clustering algorithm that produces a partitional clustering, in which the number of clusters is automatically determined by the algorithm. Points in low-density regions are classified as noise and omitted; thus, DBSCAN does not produce a complete clustering.

A prototype-based cluster is a set of objects in which each object is closer (more similar) to the prototype that defines the cluster than to the prototype of any other cluster. For data with continuous attributes, the prototype of a cluster is often a centroid, i.e., the average (mean) of all the points in the cluster. When a centroid is not meaningful, such as when the data has categorical attributes, the prototype is often a medoid, i.e., the most representative point of a cluster. For many types of data, the prototype can be regarded as the most central point. These clusters tend to be globular. K-means is a prototype-based, partitional clustering technique that attempts to find a user-specified number of clusters (K), which are represented by their centroids. Prototype-based clustering techniques create a one-level partitioning of the data objects. There are a number of such techniques, but two of the most prominent are K-means and K-medoid. K-means defines a prototype in terms of a centroid, which is usually the mean of a group of points, and is typically applied to objects in a continuous n-dimensional space. K-medoid defines a prototype in terms of a medoid, which is the most representative point for a group of points, and can be applied to a wide range of data since it requires only a proximity measure for a pair of objects. While a centroid almost never corresponds to an actual data point, a medoid, by its definition, must be an actual data point.

In the k-means clustering technique K initial centroids are selected, the number of clusters desired. Each point in the data set is then assigned to the closest centroid, and each collection of points assigned to a centroid is a cluster. The centroid of each cluster is then updated based on the points assigned to the cluster. We iteratively assign points and update until convergence (no point changes clusters), or equivalently, until the centroids remain the same. For some combinations of proximity functions and types of centroids, K-means always converges to a solution; i.e., K-means reaches a state in which no points are shifting from one cluster to another, and hence, the centroids don't change. Because convergence tends to b asymptotic, the end condition may be set as a maximum change between iterations. Because of the possibility that the optimization results in a local minimum instead of a global minimum, errors may be maintained unless and until corrected. Therefore, a human assignment or reassignment of data points into classes, either as a constraint on the optimization, or as an initial condition, is possible.

To assign a point to the closest centroid, a proximity measure is required. Euclidean (L2) distance is often used for data points in Euclidean space, while cosine similarity may be more appropriate for documents. However, there may be several types of proximity measures that are appropriate for a given type of data. For example, Manhattan (L1) distance can be used for Euclidean data, while the Jaccard measure is often employed for documents. Usually, the similarity measures used for K-means are relatively simple since the algorithm repeatedly calculates the similarity of each point to each centroid, and thus complex distance functions incur computational complexity. The clustering may be computed as a statistical function, e.g., mean square error of the distance of each data point according to the distance function from the centroid. Note that the K-means may only find a local minimum, since the algorithm does not test each point for each possible centroid, and the starting presumptions may influence the outcome. The typical distance functions for documents include the Manhattan (L1) distance, Bregman divergence, Mahalanobis distance, squared Euclidean distance and cosine similarity.

An optimal clustering will be obtained as long as two initial centroids fall anywhere in a pair of clusters, since the centroids will redistribute themselves, one to each cluster. As the number of clusters increases, it is increasingly likely that at least one pair of clusters will have only one initial centroid, and because the pairs of clusters are further apart than clusters within a pair, the K-means algorithm will not redistribute the centroids between pairs of clusters, leading to a suboptimal local minimum. One effective approach is to take a sample of points and cluster them using a hierarchical clustering technique. K clusters are extracted from the hierarchical clustering, and the centroids of those clusters are used as the initial centroids. This approach often works well, but is practical only if the sample is relatively small, e.g., a few hundred to a few thousand (hierarchical clustering is expensive), and K is relatively small compared to the sample size. Other selection schemes are also available.

The space requirements for K-means are modest because only the data points and centroids are stored. Specifically, the storage required is $O((m+K)n)$, where m is the number of points and n is the number of attributes. The time requirements for K-means are also modest-basically linear in the number of data points. In particular, the time required is $O(I \times K \times m \times n)$, where I is the number of iterations required for convergence. As mentioned, I is often small and can usually be safely bounded, as most changes typically occur in the first few iterations. Therefore, K-means is linear in m, the number of points, and is efficient as well as simple provided that K, the number of clusters, is significantly less than m.

Outliers can unduly influence the clusters, especially when a squared error criterion is used. However, in some clustering applications, the outliers should not be eliminated or discounted, as their appropriate inclusion may lead to important insights. In some cases, such as financial analysis, apparent outliers, e.g., unusually profitable investments, can be the most interesting points.

Hierarchical clustering techniques are a second important category of clustering methods. There are two basic approaches for generating a hierarchical clustering: Agglomerative and divisive. Agglomerative clustering merges close clusters in an initially high dimensionality space, while divisive splits large clusters. Agglomerative clustering relies upon a cluster distance, as opposed to an object distance. For example, the distance between centroids or medoids of the clusters, the closest points in two clusters, the further points in two clusters, or some average distance metric. Ward's method measures the proximity between two clusters in terms of the increase in the sum of the squares of the errors that results from merging the two clusters.

Agglomerative Hierarchical Clustering refers to clustering techniques that produce a hierarchical clustering by starting with each point as a singleton cluster and then repeatedly merging the two closest clusters until a single, all-encompassing cluster remains. Agglomerative hierarchical clustering cannot be viewed as globally optimizing an objective function. Instead, agglomerative hierarchical clustering techniques use various criteria to decide locally, at each step, which clusters should be merged (or split for divisive approaches). This approach yields clustering algorithms that avoid the difficulty of attempting to solve a hard combinatorial optimization problem. Furthermore, such approaches do not have problems with local minima or difficulties in choosing initial points. Of course, the time complexity of $O(m2 \log m)$ and the space complexity of $O(m2)$ are prohibitive in many cases. Agglomerative hierarchical clustering algorithms tend to make good local decisions about combining two clusters since they can use information about the pair-wise similarity of all points. However, once a decision is made to merge two clusters, it cannot be undone at a later time. This approach prevents a local optimization criterion from becoming a global optimization criterion.

In supervised classification, the evaluation of the resulting classification model is an integral part of the process of developing a classification model. Being able to distinguish whether there is non-random structure in the data is an important aspect of cluster validation.

In one embodiment, a k-means algorithm is used as follows:

The K Means Clustering algorithm finds observations in a dataset that are like each other and places them in a set. The process starts by randomly assigning each data point to an initial group and calculating the centroid for each one. A centroid is the center of the group. Note that some forms of the procedure allow you to specify the initial sets.

Then the algorithm continues as follows:

It evaluates each observation, assigning it to the closest cluster. The definition of "closest" is that the Euclidean distance between a data point and a group's centroid is shorter than the distances to the other centroids.

When a cluster gains or loses a data point, the K means clustering algorithm recalculates its centroid.

The algorithm repeats until it can no longer assign data points to a closer set.

When the K means clustering algorithm finishes, all groups have the minimum within-cluster variance, which keeps them as small as possible. Sets with minimum variance and size have data points that are as similar as possible. There is variability amongst the characteristics in each cluster, but the algorithm minimizes it.

In short, the observations within a set should share characteristics. In some cases, the analysts might need to specify different numbers of groups to determine which value of K produces the most useful results.

In one embodiment, an artificial intelligence engine 402, in response to measured glucose information, provides information relative to one or more components of smartwatch 200 to predict what will happen; or prescriptive, meaning the system will use the data to make suggestions about what action to take, This predictive information can be, based on the user's glucose information, make recommendation to the user about future ways to control the user's glucose, including but not limited to: real-time blood glucose information, manually log blood glucose, food, medication, and exercise. User's can also view various daily statistics and diabetes management goals they set.

As a non-limiting example, the artificial intelligence engine 402 is used for systems with a deep learning networks with many layers. The layered network can process extensive amounts of data and determine the "weight" of each link in the network—for example, in an image recognition system, some layers of the neural network might detect individual features of a face, like eyes, nose, or mouth, while another layer would be able to tell whether those features appear in a way that indicates a face.

As will be appreciated by those skilled in the art, there are many different artificial intelligence engines 402 that can be trained to generate suitable output values for a range of input values; the neuro-fuzzy logic engine 402 is merely one embodiment.

The measurement data, the information feeds, and the output parameters may be used to train an artificial intelligence engine 402 to control the one or more devices in response to the measurement data and information feeds In one embodiment, artificial intelligence engines 400 can be trained to recognize temporal patterns.

In one embodiment, the measurement data, the information feeds, and the output parameters may be used to train an artificial intelligence engine 402 to control the one or more devices in response to the measurement data and information feeds.

Figure 29:
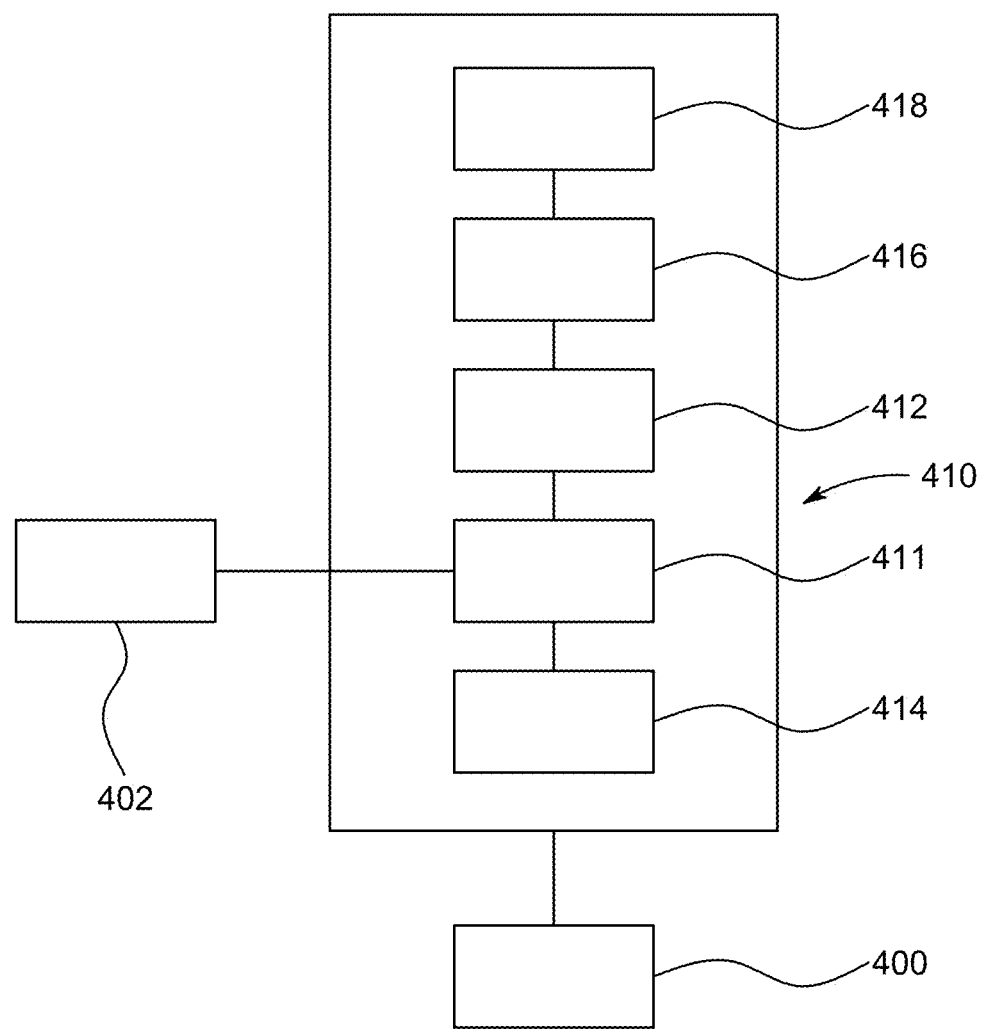
FIG. 29 illustrates one embodiment of a computing system used with artificial intelligence.

Referring to FIG. 29, a computing system 410 includes a logic subsystem 411 and a storage subsystem 412. Computing system 410 may further include an input subsystem 414, an output subsystem 416, a communication subsystem 418, and/or other components not shown in FIG. 11.

Logic subsystem 411 may include one or more physical logic devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 411 may include one or more processors (as an example of physical logic devices) configured to execute software instructions. Additionally, or alternatively, the logic subsystem may include one or more hardware and/or firmware logic machines (as an example of physical logic devices) configured to execute hardware or firmware instructions. Processors of the logic subsystem may be single-core or multi-core, and the instructions executed thereon may be configured for sequential, parallel, and/or distributed processing. Individual components of the logic subsystem may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 412 includes one or more physical, non-transitory memory devices configured to hold instructions executable by the logic subsystem in non-transitory form, to implement the methods and processes described herein. When such methods and processes are implemented, the state of storage subsystem 412 may be transformed. e.g., to hold different data. Storage subsystem 1112 may include removable and/or built-in devices. Storage subsystem 412 may include optical memory devices, semiconductor memory devices, and/or magnetic memory devices, among other suitable forms. Storage subsystem 412 may include volatile, nonvolatile, dynamic, static, read/write, read-only, random-access, sequential-access, location-addressable, file-addressable, and/or content-addressable devices. Aspects of logic subsystem 410 and storage subsystem 412 may be integrated together into one or more hardware-logic components. While storage subsystem 412 includes one or more physical devices, aspects of the instructions described herein alternatively may be propagated by a communication medium (e.g., an electromagnetic signal, an optical signal, etc.) that is not necessarily held by a physical device for a finite duration.

The terms "module," "program," and "engine" may be used to describe an aspect of computing system 04100 implemented to perform a particular function. In some cases, a module, program, or engine may be instantiated via logic subsystem 410 executing instructions held by storage subsystem 412. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. A "service", as used herein, may refer to an application program executable across multiple user sessions. A service may be available to one or more system components, programs, and/or other services. In some implementations, a service may run on one or more server-computing devices.

Each of the following references is expressly incorporated herein by reference in its entirety:

Abraham, Ittai, et al. "Low-distortion inference of latent similarities from a multiplex social network." SIAM Journal on Computing 44.3 (2015): 617-668.

Aldenderfer, M. S., and R. K. Blashfield. Cluster Analysis. Sage Publications, Los Angeles, 1985.

Anderberg, M. R. (1973). Cluster Analysis for Applications. Academic Press, New York.

Anderson, E. (1957). A semi-graphical method for the analysis of complex problems. Proc. Nat. Acad. Sci. USA 43923-927.

Anderson, T. W. (1958). An Introduction to Multivariate Statistical Analysis. Wiley, New York.

Anderson, T. W., and Bahadur, R. R. (1962). classification into two multivariate normal distributions with different covariance matrices. Ann. Math. Statist. 33420-431.

Andrews, D. F. (1972). Plots of high-dimensional data. Biometrics 28 125-136.

Ankerst, M., M. M. Breunig, H.-P. Kriegel, and J. Sander. OPTICS: Ordering Points To Identify the Clustering Structure. In Proc. of 1999 ACM-SIGMOD Intl. Conf. on Management of Data, pages 49-60, Philadelphia, Pa., June 1999. ACM Press.

Arabie, P. (1977). clustering representations of group overlap. J. Math. Soc. 5 112-128.

Arabie, P. and Carroll, J. D. (1980). MAPCLUS: A mathematical programming approach to fitting to ADCLUS model. Psychometrika 45211-235.

Arabie, P., L. Hubert, and G. D. Soete. An overview of combinatorial data analysis. In P. Arabie, L. Hubert, and G. D. Soete, editors, Clustering and Classification, pages 188-217. World Scientific, Singapore, January 1996.

Art, D., Gnanadesikan, R., and Kettenring, J. R. (1982). Data-based metrics for cluster analysis. Utilitas Mathematica 31A 75-99.

Asimov, D. (1985). The grand tour. SLAM J. Sci. Statist. Corn-put. 6 128-143.

Auffarth, Benjamin, Yasumasa Muto, and Yasuharu Kunii. "An artificial system for visual perception in autonomous Robots." Proceedings of the IEEE International Conference on Intelligent Engineering Systems. 2005.

Babu, B. Hari, N. Subash Chandra, and T. Venu Gopal. "Clustering Algorithms For High Dimensional Data—A Survey Of Issues And Existing Approaches."

Baker, F. B. (1974). Stability of two hierarchical grouping techniques, Case I: Sensitivity to data errors. J. Amer. Statist. Assoc. 69440-445.

Ball, G., and D. Hall. A Clustering Technique for Summarizing Multivariate Data. Behavior Science, 12:153-155, March 1967.

Banerjee, A., S. Merugu, I. S. Dhillon, and J. Ghosh. Clustering with Bregman Divergences. In Proc. of the 2004 SIAM Intl. Conf. on Data Mining, pages 234-245, Lake Buena Vista, Fla., April 2004.

Baraglia, R., Dazzi, P., Mordacchini, M., & Ricci, L. (2013). A peer-to-peer recommender system for self-emerging user communities based on gossip overlays. Journal of Computer and System Sciences, 79(2), 291-308.

Baragliaa, R., Dazzia, P., Mordacchinib, M., & Riccic, L. A Peer-to-Peer Recommender System for self-emerging user communities based on Gossip Overlays. (2012)

Beck, Carolyn, et al. "Dynamic Coverage and Clustering: A Maximum Entropy Approach." Distributed Decision Making and Control. Springer London, 2012. 215-243.

Becker, P. (1968). Recognitions of Patterns. Polyteknisk, Copenhagen.

Bell, P. A. and Korey, J. L. (1975). QUICLSTR: A FORTRAN program for hierarchical cluster analysis with a large number of subjects. Behavioral Research Methods and Instrumentation 7575.

Berg, Mikko. "Human abilities to perceive, understand, and manage multi-dimensional information with visualizations." (2012).

Birkin, P. Survey Of Clustering Data Mining Techniques. Technical report, Accrue Software, San Jose, Calif., 2002.

Bhat, Sajid Yousuf, and Muhammad Abolish. "A density-based approach for mining overlapping communities from social network interactions." Proceedings of the 2nd International Conference on Web Intelligence, Mining and Semantics. ACM, 2012.

Binder, D. A. (1978). Comment on 'Estimating mixtures of normal distributions and switching regressions'. j Amer. Statist. Assoc. 73746-747.

Blashfield, R. K., Aldenderfer, M. S. and Morey, L. C. (1982). cluster analysis literature on validation. In Classifying Social Data. (H. Hudson, ed.) 167-176. Jossey-Bass, San Francisco.

Bock, H. H. (1985). On significance tests in cluster analysis. J. Classification 277-108.

Boley, D. Principal Direction Divisive Partitioning. Data Mining and Knowledge Discovery, 2(4):325-344, 1998.

Bosley, Daniel, and Vivian Borst. "A General Unsupervised Clustering Tool for Unstructured Data." matrix 100: 2.

Boratto, Ludovico. "Group recommendation with automatic detection and classification of groups." (2012).

Bradley, P. S. and U. M. Fayyad. Refining Initial Points for K-Means Clustering. In Proc. of the 15th Intl. Conf. on Machine Learning, pages 91-99, Madison, Wis., July 1998. Morgan Kaufmann Publishers Inc.

Breiman, L. Meisel, W. S., and Purcell, E. (1977). Variable kernel estimates of multivariate densities and their calibration. Technometrics 19 135-144.

Brineman, L., Friedman, J. H., Olshen, R. A., and Stone, C. J. (1984). Classification and Regression Trees. Wadsworth, Belmont, Calif.

Broadbent, S. R. and Hammersley, J. M. (1957). Percolation Processes, I: Crystals and Mazes. Proc. Cambridge Philos. Soc. 53629-641.

Bu, Yingyi, et al. "The HaLoop approach to large-scale iterative data analysis." The VLDB Journal—The International Journal on Very Large Data Bases 21.2 (2012): 169-190.

Buja, A., Hurify, C. and Mcdonald, J. A. (1986). A data viewer for multivariate data. Computer Science and Statistics: Proceedings of the 18th Symposium on the Interface 171-174.

Cacoullos, T. (1966). Estimation of a multivariate density. Ann. Math. Statist. 18 179-189.

Cal, Rui, et al. "Scalable music recommendation by search." Proceedings of the 15th international conference on Multimedia. ACM, 2007.

Carrizosa, Emilio, and Dolores Romero Morales. "Supervised classification and mathematical optimization." Computers & Operations Research 40.1 (2013): 150-165.

Chang, Chin-Chun, and Hsin-Yi Chen. "Semi-supervised clustering with discriminative random fields." Pattern Recognition 45.12 (2012): 4402-4413.

Chen, H., Gnanadesikan, R., and Kettenring, J. R. (1974). Statistical methods for grouping corporations. Sankhya B 36 1-28.

Chen, Yen Hung. "The k Partition-Distance Problem." Journal of Computational Biology 19.4 (2012): 404-417.

Cheng, Hong, et al. "Clustering large attributed information networks: an efficient incremental computing approach." Data Mining and Knowledge Discovery 25.3 (2012): 450-477.

Chernoff, H. (1972). The selection of effective attributes for deciding between hypotheses using linear discriminant functions. In Frontiers of Pattern Recognition. (S. Watanabe, ed.) 55-60. Academic Press, New York.

Chernoff, H. (1973a). Some measures for discriminating between normal multivariate distributions with unequal covariance matrices. In Multivariate Analysis Ill. (P. R. Krishnaiah, ed.) 337-344. Academic Press, New York.

Chernoff, H. (1973b). The use of faces to represent points in k-dimensional space graphically. J Amer. Statist. Assoc. 68 361-368.

Cherubini, Umberto, and Agnese Sironi. Bond Trading, Market Anomalies and Neural Networks: An Application with Kohonen Nets. No. _012. Society for Computational Economics.

Christou, Ioannis T., George Gekas, and Anna Kyrikou. "A classifier ensemble approach to the TV-viewer profile adaptation problem." International Journal of Machine Learning and Cybernetics 3.4 (2012): 313-326.

Clunies-Ross, C. W. and Riffenburgh, R. H. (1960). Geometry and linear discrimination. Biometrika 47185-189.

Cormack, R. M. (1971). A review of classification (with discussion). J Roy. Statist. Soc. A 134321-367.

Cover, T. M. (1968). Estimation by the nearest neighbor rule. IEEE Transactions Information Theory IT-14 50-55.

Cover, T. M. and Hart, P. E. (1967). Nearest neighbor pattern classification. IEEE Transactions, Information Theory IT-13 21-27.

Dallal, G. E. (1975) A user's guide to J. A. Hartigan's clustering algorithms. (unpublished manuscript) Yale University.

Day, N. E. (1969). Estimating the components of a mixture of normal distributions. Biometrika 56463-474.

Day, N. E., and Kerridge, D. F., (1967). A general maximum likelihood discriminant. Biometrics 23313-323. 94 de Master, Trabajo Fin. "Novelty and Diversity Enhancement and Evaluation in Recommender Systems." (2012).

Defays, D. (1977). An efficient algorithm for a complete link method. Computer Journal 20364-366.

Derrac, Joaquin, Isaac Triguero, Salvador Garcia, and Francisco Herrera. "Integrating instance selection, instance weighting, and feature weighting for nearest neighbor classifiers by coevolutionary algorithms."

It is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The invention claimed is:

1. A glucose detection or monitoring system, comprising:
a VCSEL system, comprising:
a tunable VCSEL laser including:
a first mirror;
one or more active regions with a first active region adjacent to the first mirror, each of an active region including quantum wells and barriers, each of an active region surrounded by one or more p-n junctions, the one or more active regions including a selected shape structure each with a tunnel junction (TJ);
one or more apertures provided with the selected shape structure;
one or more buried tunnel junctions (BTJ), additional TJ's, planar structures and additional BTJ's are created during a regrowth process that is independent of a first growth process of the first mirror, the active region and the one or more TJs;
one or more electrical confinement apertures defined by the one or more BTJ's, additional TJ's, planar structures and additional BTJ;
a vertical resonator cavity disposed over the one or more electrical confinement apertures;
a high contrast grating (HCG) operating as a second mirror positioned over the vertical resonator cavity, the HCG configured to reflect a first portion of light back into the vertical resonator cavity, and a second portion of the light as an output beam from the tunable VCSEL laser, the HCG structure being layered on the selected shape structure;
wherein a shape of the output beam of the tunable VCSEL laser is determined by a geometric shape of the one or more BTJ apertures, apertures for additional TJ's, planar structures and additional BTJ's, with a transmission function of the HCG and is designed according to a desired optical transmission function of an application; and a DBR on one side of the junctions, and the HCG on the other side of the junctions;
a smartwatch having a housing with an interior that houses the tunable VCSEL laser; and
the smartwatch including one or more of a display, an optical sensor, one or more electrodes, a SIM card slot, a speaker, a microphone, charging pins, and a band.

2. The system of claim 1, wherein the tunable VCSEL laser produces an output beam of electromagnetic energy.

3. The system of claim 2, wherein the electromagnetic energy is derived as a coherent mixing of electromagnetic radiation within a resonant cavity of the tunable VCSEL laser.

4. The system of claim 3, wherein the coherent mixing of electromagnetic radiation is a mixing of a first amount of electromagnetic radiation generated by the tunable VCSEL laser, and a second amount of electromagnetic radiation redirected into an electromagnetic radiation source.

5. The system of claim 1, wherein the tunable VCSEL laser is coupled to the first mirror.

6. The system of claim 1, further comprising: an electrical sensor to monitor a junction voltage of the tunable VCSEL laser.

7. The system of claim 6, wherein a measurement of the junction voltage provides a measurement of a power of the output beam.

8. The system of claim 1, wherein an output of the tunable VCSEL laser has a long wavelength in infrared range.

9. The system of claim 8, wherein the long wavelength is from 1 micron to 1.7 microns.

10. The system of claim 1, wherein the tunable VCSEL laser produces a wavelength of 1550 nm.

11. The system of claim 9, wherein the long wavelength is 1.365 microns.

12. The system of claim 3, wherein the output beam of the tunable VCSEL laser is a long wavelength in infrared range, at least partially created from indium phosphide structure in the laser structure.

13. The system of claim 4, wherein the VCSEL laser wherein the HCG is an HCG indium phosphide substrate.

14. The system of claim 1, wherein the tunable VCSEL laser includes a bottom DBR which is a semiconductor DBR or a combination of a semiconductor DBR with a dielectric coating.

15. The system of claim 1, wherein the tunable VCSEL laser includes a dielectric coating.

16. The system of claim 1, wherein the tunable VCSEL laser operates in a single mode or a multi-mode operation.

17. The system of claim 1, wherein the tunable VCSEL laser operates in a single mode.

18. The system of claim 1, wherein dimensions of the one or more apertures and the HCG are contributing factors to a single mode operation.

* * * * *